US012678956B2

(12) United States Patent
Park et al.

(10) Patent No.: US 12,678,956 B2
(45) Date of Patent: Jul. 14, 2026

(54) SYSTEM AND METHOD FOR PROVIDING SIGN LANGUAGE SERVICE

(71) Applicants:HYUNDAI MOTOR COMPANY, Seoul (KR); KIA CORPORATION, Seoul (KR); SUNGSHIN WOMEN'S UNIVERSITY INDUSTRY-ACADEMIC COOPERATION FOUNDATION, Seoul (KR)

(72) Inventors: Ju Hee Park, Suwon-si (KR); Soo Min Shim, Yongin-si (KR); Jeong Min Oh, Seoul (KR); Bo Kyung Kim, Daejeon (KR); Seong Wook Hwang, Seoul (KR); Joon Young Kim, Seoul (KR)

(73) Assignees: HYUNDAI MOTOR COMPANY, Seoul (KR); KIA CORPORATION, Seoul (KR); SUNGSHIN WOMENS'S UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 182 days.

(21) Appl. No.: 18/536,585

(22) Filed: Dec. 12, 2023

(65) Prior Publication Data

US 2025/0065504 A1     Feb. 27, 2025

(30) Foreign Application Priority Data

Aug. 23, 2023     (KR) ........................ 10-2023-0110699

(51) Int. Cl.
B25J 9/16          (2006.01)
G06F 3/14          (2006.01)
(Continued)

(52) U.S. Cl.
CPC .............. B25J 9/1669 (2013.01); G06F 3/14 (2013.01); G06F 40/40 (2020.01); H04L 67/306 (2013.01)

(58) Field of Classification Search
CPC .......... B25J 9/1669; G06F 3/14; G06F 40/40; G06F 40/30; H04L 67/306; G09B 21/009;
(Continued)

(56) References Cited

U.S. PATENT DOCUMENTS 8,566,081 B2 * 10/2013 Schoenbach ............ H04L 67/12
2002/0069067 A1 * 6/2002 Klinefelter ............. H04R 25/70
(Continued)

FOREIGN PATENT DOCUMENTS

JP          2004163772 A     6/2004
KR       20160122869 A     10/2016
(Continued)

OTHER PUBLICATIONS

Machine Translation of Kpp KR101700807B1, "Method and Server for Transfer Message Between Mobile Terminals" (Year: 2017).*

Primary Examiner — Ellis B. Ramirez
(74) Attorney, Agent, or Firm — Lempia Summerfield Katz LLC

(57)          ABSTRACT

A system and a method for providing a sign language service are provided. The system includes a first terminal that generates at least one piece of first message data corresponding to a message to be delivered by a first user. The system also includes a server that converts the first message data received from the first terminal into first operation data corresponding to an operation of a robot. The system also includes the robot that performs an operation according to the first operation data received from the server. The server sorts two or more pieces of first operation data based on a transmission order according to a predetermined criterion, (Continued)

when identifying the two or more pieces of first operation data, and transmits the pieces of sorted first operation data to the robot. The robot performs the operation, based on the pieces of sorted first operation data.

18 Claims, 16 Drawing Sheets

(51) Int. Cl.
    *G06F 40/40*         (2020.01)
    *H04L 67/306*      (2022.01)

(58) Field of Classification Search
    CPC .......... G09B 21/04; F21S 10/02; F21V 33/00;
                             F21W 2111/00; F21Y 2113/10
    USPC ................ 700/245; 704/260; 901/1; 434/112
    See application file for complete search history.

(56)                    References Cited

U.S. PATENT DOCUMENTS

| | | | | |
|---|---|---|---|---|
| 2010/0112530 | A1* | 5/2010 | Schoenbach | ........... H04N 7/147 |
| 2013/0115578 | A1 | 5/2013 | Shiina et al. | |
| 2013/0204605 | A1* | 8/2013 | Illgner-Fehns | .......... G06F 40/40 |
| 2015/0130887 | A1* | 5/2015 | Thelin | .................... H04N 7/025 |
| 2016/0164815 | A1* | 6/2016 | Cho | ........................ G06F 40/30 |
| 2018/0085928 | A1* | 3/2018 | Yamato | ................... G06F 40/30 |
| 2019/0279529 | A1 | 9/2019 | Al-Gabri et al. | |
| 2020/0005673 | A1* | 1/2020 | Lin | ......................... G06F 40/58 |
| 2020/0338745 | A1 | 10/2020 | Adiletta | |
| 2021/0133290 | A1* | 5/2021 | Makke | ................... G10L 15/22 |

FOREIGN PATENT DOCUMENTS

| | | | | |
|---|---|---|---|---|
| KR | 101700807 | B1 * | 2/2017 | ............. H04W 4/12 |
| KR | 102037789 | B1 | 10/2019 | |

* cited by examiner

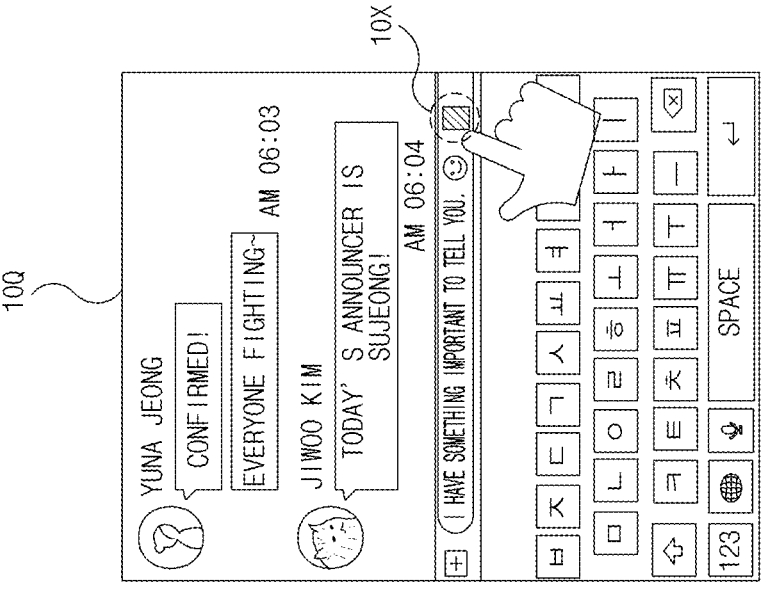
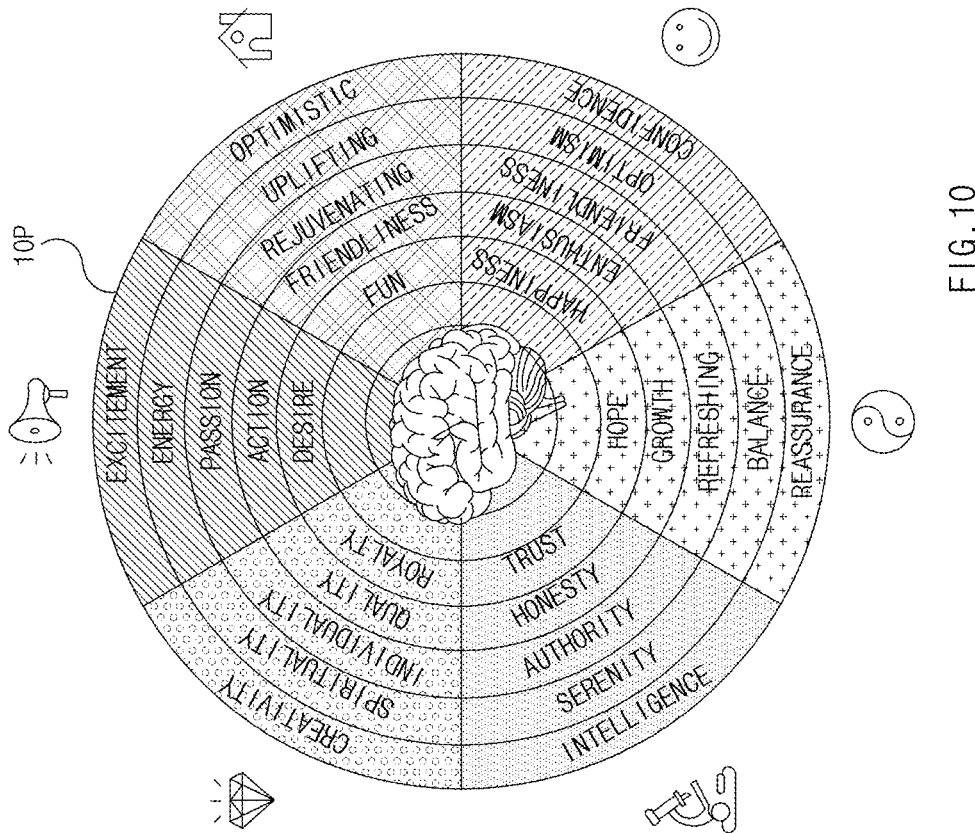
FIG.10

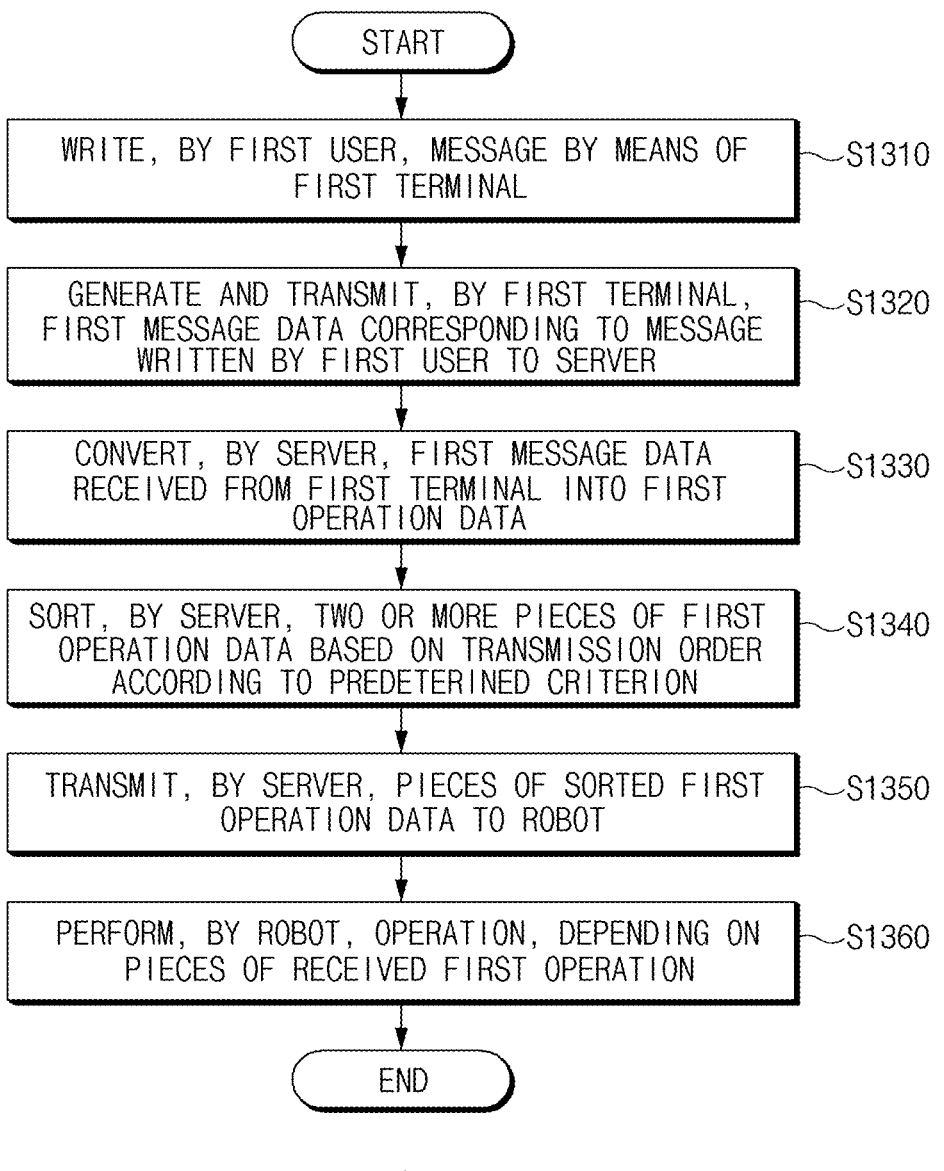

START

WRITE, BY FIRST USER, MESSAGE BY MEANS OF FIRST TERMINAL ~S1310

GENERATE AND TRANSMIT, BY FIRST TERMINAL, FIRST MESSAGE DATA CORRESPONDING TO MESSAGE WRITTEN BY FIRST USER TO SERVER ~S1320

CONVERT, BY SERVER, FIRST MESSAGE DATA RECEIVED FROM FIRST TERMINAL INTO FIRST OPERATION DATA ~S1330

SORT, BY SERVER, TWO OR MORE PIECES OF FIRST OPERATION DATA BASED ON TRANSMISSION ORDER ACCORDING TO PREDETERINED CRITERION ~S1340

TRANSMIT, BY SERVER, PIECES OF SORTED FIRST OPERATION DATA TO ROBOT ~S1350

PERFORM, BY ROBOT, OPERATION, DEPENDING ON PIECES OF RECEIVED FIRST OPERATION ~S1360

END

FIG.13

SYSTEM AND METHOD FOR PROVIDING SIGN LANGUAGE SERVICE

CROSS-REFERENCE TO RELATED APPLICATION

This application claims the benefit of and priority to Korean Patent Application No. 10-2023-0110699, filed in the Korean Intellectual Property Office on Aug. 23, 2023, the entire contents of which are incorporated herein by reference.

TECHNICAL FIELD

The present disclosure relates to a system and a method for providing a sign language service, and more particularly relates to technologies of delivering a message of a user as a sign language by means of an operation of a robot.

BACKGROUND

The statements in this section merely provide background information related to the present disclosure and may not constitute prior art.

A sign language robot is a robot, which communicates with a hearing-impaired person. The sign language robot serves to translate a message to be delivered to the hearing-impaired person by a user into a sign language and notifies the hearing-impaired person of the sign language.

An existing sign language robot may frequently deliver only information of one user. Thus, when several persons want to communicate with each other by means of sign languages, there is a need for several sign language robots. When several persons communicate with each other through several sign language robots, because several robots simultaneously perform sign language operations, conversion may become complicated. Furthermore, because one robot per person is needed, the cost burden increases.

SUMMARY

The present disclosure has been made to solve the above-mentioned problems occurring in the prior art while advantages achieved by the prior art are maintained intact.

An aspect of the present disclosure provides a system and a method for providing a sign language service to allow several users to perform bidirectional communication through one robot as the one robot translates a plurality of messages transmitted by several users into sign languages based on a certain order.

Another aspect of the present disclosure provides a system and a method for providing a sign language service to deliver an emotion, an intention, or the like to be delivered through a message by the user together with the message by means of a light emitting element of a robot, which emits lights of different colors, to improve the accuracy of delivering the message.

Another aspect of the present disclosure provides a system and a method for providing a sign language service to reduce costs as several users communicate with each other through one robot.

Another aspect of the present disclosure provides a system and a method for providing a sign language service to deliver a message with high importance or urgency to several persons at once to improve convenience.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a system for providing a sign language service may include a first terminal that generates at least one piece of first message data corresponding to a message to be delivered by a first user. The system for providing the sign language service may further include a server that converts the first message data received from the first terminal into first operation data corresponding to an operation of a robot. The system for providing the sign language service may further include the robot that performs an operation according to the first operation data received from the server. The server may sort two or more pieces of first operation data based on a transmission order according to a predetermined criterion, when identifying the two or more pieces of first operation data. The server may further transmit the pieces of sorted first operation data to the robot. The robot may perform the operation, based on the pieces of sorted first operation data.

In an embodiment, the system may further include a second terminal that generates at least one piece of second message data corresponding to a message to be delivered by a second user. The server may convert the second message data received from the second terminal into second operation data corresponding to the operation of the robot. The server may further sort the first operation data and the second operation data based on the transmission order according to the predetermined criterion, when two or more pieces of the first operation data and the second operation data are identified. The server may further transmit the sorted first operation data and second operation data to the robot. The robot may further perform the operation, based on the sorted first operation data and second operation data.

In an embodiment, the predetermined criterion in the system may be set based on at least one of a chronological order in which the first message data is transmitted through the first terminal, a chronological order in which the first message data is received in the server, a chronological order determined according to nature of the first message data, or any combination thereof.

In an embodiment, the server may further analyze at least one of an intention of the message, an emotion contained in the message, importance of the message, or any combination thereof based on the first message data. The server may further convert the first message data into the first operation data, based on an analyzed result.

In an embodiment, the first message data may include first user information including at least one of a name of the first user corresponding to the first terminal, an ID of the first user, a nickname of the first user, an age of the first user, a gender of the first user, a number for specifying the first user, or any combination thereof. The server may store the first user information in a database.

In an embodiment, the server may further recommend a message phrase to the first user, based on the first user information stored in the database.

In an embodiment, the robot may further perform a finishing operation indicating end of the operation according to the first operation data, when performance of the operation according to the first operation data received from the server is ended.

In an embodiment, the first message data may include first user information including at least one of a name of the first user corresponding to the first terminal, an ID of the first user, a nickname of the first user, an age of the first user, a gender of the first user, a number for specifying the first user, or any combination thereof. The second message data may include second user information including at least one of a name of the second user corresponding to the second terminal, an ID of the second user, a nickname of the second user, an age of the second user, a gender of the second user, a number for specifying the second user, or any combination thereof. The robot may further separate the operation according to the first operation data and an operation according to the second operation data to perform the operation, based on the first user information and the second user information.

In an embodiment, the robot may include a light emitting element. The robot may further perform the operation according to the first operation data together with a light corresponding to a first color through the light emitting element. The robot may further perform the operation according with to the second operation data together a light corresponding to a second color through the light emitting element.

In an embodiment, the robot may include a light emitting element and may further perform the operation according to the first operation data together with at least one light represented by means of the light emitting element. The at least one light may indicate at least one of an intention of the message, an emotion contained in the message, importance of the message, or any combination thereof.

In an embodiment, the first terminal may generate the first message data including a color entered by the first user. The robot may include a light emitting element and may further perform the operation according to the first operation data, together with a light corresponding to the color entered by the first user. The color is represented by means of the light emitting element.

In an embodiment, the system may further include a display. The first terminal may further generate the first message data including at least one of a color entered by the first user, an emoticon entered by the first user, or any combination thereof. The display may receive the first message data or the first operation data from the server and may display information corresponding to the at least one of the color entered by the first user, the emoticon entered by the first user, or the any combination thereof. The information is included in the first message data or the first operation data.

According to another aspect of the present disclosure, a method for providing a sign language service may include generating, by a first terminal, at least one piece of first message data corresponding to a message to be delivered by a first user. The method for providing the sign language service may further include converting, by a server, the first message data received from the first terminal into first operation data corresponding to an operation of a robot. The method for providing the sign language service may further include sorting, by the server, two or more pieces of first operation data based on a transmission order according to a predetermined criterion, when identifying the two or more pieces of first operation data. The method for providing the sign language service may further include transmitting, by the server, the pieces of sorted first operation data to the robot, and performing, by the robot, an operation according to the first operation data received from the server. Performing of the operation according to the first operation data received from the server by the robot may include performing, by the robot, the operation, based on the pieces of sorted first operation data.

In the method according to an embodiment, the method may further include generating, by a second terminal, at least one piece of second message data corresponding to a message to be delivered by a second user. Converting of the first message data received from the first terminal into the first operation data corresponding to the operation of the robot by the server may include converting, by the server, the second message data received from the second terminal into second operation data corresponding to the operation of the robot. Sorting of the two or more pieces of first operation data based on the transmission order according to the predetermined criterion, when identifying the two or more pieces of first operation data, by the server may include sorting, by the server, the first operation data and the second operation data based on the transmission order according to the predetermined criterion, when two or more pieces of the first operation data and the second operation data are identified. Transmitting of the pieces of sorted first operation data to the robot by the server may include transmitting, by the server, the sorted first operation data and second operation data to the robot. Performing of the operation according to the first operation data received from the server by the robot may include performing, by the robot, the operation, based on the sorted first operation data and second operation data.

In the method according to an embodiment, the predetermined criterion in the method may be set based on at least one of a chronological order in which the first message data is transmitted through the first terminal, a chronological order in which the first message data is received in the server, a chronological order determined according to nature of the first message data, or any combination thereof.

In the method according to an embodiment, converting of the first message data received from the first terminal into the first operation data corresponding to the operation of the robot by the server may include analyzing, by the server, at least one of an intention of the message, an emotion contained in the message, importance contained in the message, or any combination thereof based on the first message data and converting, by the server, the first message data into the first operation data, based on an analyzed result.

In the method according to an embodiment, the first message data may include first user information including at least one of a name of the first user corresponding to the first terminal, an ID of the first user, a nickname of the first user, an age of the first user, a gender of the first user, a number for specifying the first user, or any combination thereof. The method may further include storing, by the server, the first user information in a database and recommending, by the server, a message phrase to the first user, based on the first user information stored in the database.

In the method according to an embodiment, the first message data may include first user information including at least one of a name of the first user corresponding to the first terminal, an ID of the first user, a nickname of the first user, an age of the first user, a gender of the first user, a number for specifying the first user, or any combination thereof. The second message data may include second user information including at least one of a name of the second user corresponding to the second terminal, an ID of the second user, a nickname of the second user, an age of the second user, a gender of the second user, a number for specifying the second user, or any combination thereof. Performing of the operation, depending on the sorted first operation data and second operation signal, by the robot may include separating the operation according to the first operation data and an operation according to the second operation data to perform the operation, based on the first user information and the second user information.

In the method according to an embodiment, the robot may include a light emitting element. Separating of the operation according to the first operation data and the operation according to the second operation data to perform the operation, based on the first user information and the second user information, by the robot may include performing, by the robot, the operation according to the first operation data together with a light corresponding to a first color through the light emitting element and performing, by the robot, the operation according to the second operation data together with a light corresponding to a second color through the light emitting element.

In the method according to an embodiment, the robot may include a light emitting element. Performing of the operation, depending on the pieces of sorted first operation data, by the robot may include performing the operation according to the first operation data, together with at least one light represented by means of the light emitting element. The at least one light may indicate at least one of an intention of the message, an emotion contained in the message, importance of the message, or any combination thereof.

BRIEF DESCRIPTION OF THE DRAWINGS

The above and other objects, features, and advantages of the present disclosure should be more apparent from the following detailed description taken in conjunction with the accompanying drawings:

FIG. 10 is a drawing illustrating an example of a color table indicating an emotion and a screen in which a user is able to enter a color together with a message, in a system for providing a sign language service according to an embodiment of the present disclosure;

FIG. 13 is a flowchart for describing a process in which a message written by a user is implemented as an operation performed by a robot, in a method for providing a sign language service according to another embodiment of the present disclosure.

DETAILED DESCRIPTION

Figure 1:
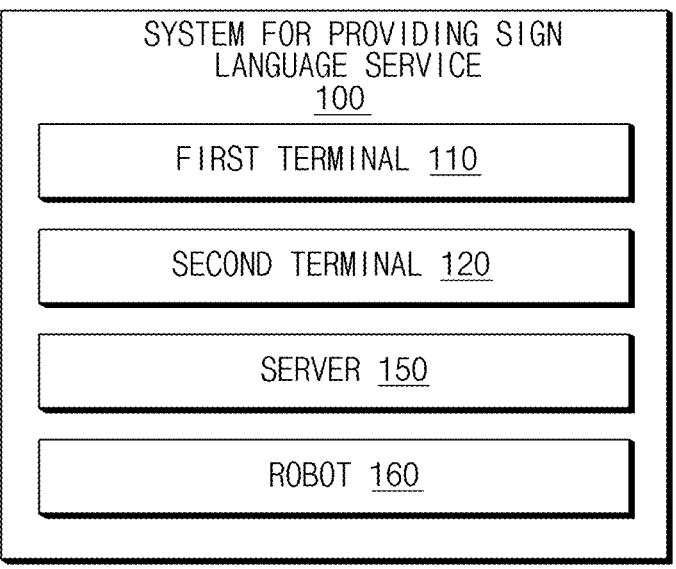
FIG. 1 is a block diagram illustrating a system for providing a sign language service according to an embodiment of the present disclosure.

Hereinafter, some embodiments of the present disclosure are described in detail with reference to the drawings. In the drawings, the same reference numerals are used throughout to designate the same or equivalent components. In addition, a detailed description of well-known features or functions has been omitted in order not to unnecessarily obscure the gist of the present disclosure.

In describing components of embodiments of the present disclosure, the terms first, second, A, B, (a), (b), and the like may be used herein. These terms are only used to distinguish one component from another component but do not limit the corresponding components irrespective of the order or priority of the corresponding components. Furthermore, unless otherwise defined, all terms including technical and scientific terms used herein should be interpreted as is customary in the art to which this present disclosure belongs. It should be understood that terms used herein should be interpreted as having a meaning that is consistent with their meaning in the context of this present disclosure and the relevant art. It should be also understood that the terms should not be interpreted in an idealized or overly formal sense unless expressly so defined herein. When a component, device, element, or the like of the present disclosure is described as having a purpose or performing an operation, function, or the like, the component, device, element, or the like should be considered herein as being "configured to" meet that purpose or to perform that operation or function. Each of the component, device, element, and the like may separately embody or be included with a processor and a memory, such as a non-transitory computer readable media, as part of the apparatus.

Hereinafter, embodiments of the present disclosure are described in detail with reference to FIGS. 1-14.

FIG. 1 is a block diagram illustrating a system for providing a sign language service according to an embodiment of the present disclosure.

According to an embodiment, a system 100 for providing a sign language service may include a first terminal 110, a second terminal 120, a server 150, and a robot 160. The components of the system 100 for providing the sign language service, which are shown in FIG. 1, are illustrative, and embodiments of the present disclosure are not limited thereto. For example, the system 100 for providing the sign language service may further include components, which are not shown in FIG. 1.

According to an embodiment, each of the first terminal 110 and the second terminal 120 may include at least one of a mobile phone, a smartphone, a tablet, a laptop, a smart watch, or any combination thereof. For example, each of the first terminal 110 and the second terminal 120 may include a terminal having a function for allowing a user to enter a message.

For another example, the first terminal 110 and the second terminal 120 may be terminals used by different users. For example, the first terminal 110 may be a terminal used by a first user, and the second terminal 120 may be a terminal used by a second user.

According to an embodiment, an embodiment about the first terminal 110, which is described below, may be described as an embodiment about the second terminal 120.

According to an embodiment, the first terminal 110 may generate at least one piece of first message data corresponding to a message to be delivered by the first user.

For example, the first user may enter a message to be delivered in a sign language by means of a robot, using the first terminal 110. As a detailed example, the message entered by the first user may include at least one of text, a voice, an image, or any combination thereof.

According to an embodiment, the first terminal 110 may generate first message data based on the message entered by the first user. For example, the first message data may include first user information about the first user, contents of the message entered by the first user, and the like.

For example, the first user information may include information capable of specifying a user of the first terminal. As a detailed example, the first user information may include at least one of a name of the first user corresponding to the first terminal, an ID of the first user, a nickname of the first user, an age of the first user, a gender of the first user, a number for specifying the first user, or any combination thereof.

According to an embodiment, the first terminal 110 may transmit the first message data to the server 150. For example, each of the first terminal 110 and the server 150 may include a communication circuit capable of transmitting and receiving data in a wired or wireless manner.

Herein, the communication circuit may include a circuit for wireless Internet access. For example, the communication circuit may access a wireless communication network of a wireless communication operator to use wireless communication such as third generation mobile communications (3G), long term evolution LTE-Advanced (LTE-A), or fifth generation mobile communications (5G). Furthermore, the communication circuit may be loaded into a telematics unit and may include a radio frequency (RF) antenna and a communication control module.

According to an embodiment, the server 150 may receive the first message data from the first terminal 110.

According to an embodiment, the server 150 may convert the first message data received from the first terminal 110 into first operation data corresponding to an operation of the robot 160.

For example, the first operation data may include data capable of controlling an operation of the robot 160. As a detailed example, the first operation data may include an operation for at least one of a shape of a hand and a finger, a direction of a palm, a position of the hand, a motion of the hand, which is performed when the first message data is translated into a sign language, or any combination thereof.

For example, the first operation data may include data conforming to a protocol of the robot 160. As a detailed example, the first operation data may include the information conforming to the protocol of the robot 160, such that only the robot 160 receives data.

For example, the first operation data may include robot information capable of specifying the robot 160. As a detailed example, the first operation data may include robot information causing only the specific robot 160 to perform an operation for a corresponding message in a space where there is the plurality of robots 160. In detail, the robot information may include at least one of an ID of a specific robot, a serial number of the specific robot, a nickname of the specific robot, or any combination thereof.

For another example, the first operation data may include first user information capable of specifying a user of the first terminal. As a detailed example, the first operation data may include the same first user information as first user information included in the first message data.

According to an embodiment, the server 150 may sort the first operation data and the second operation data based on a transmission order according to a predetermined criterion, when two or more pieces of the first operation data and the second operation data are identified.

For example, when the server 150 receives a plurality of pieces of message data, the plurality of pieces of operation data may be identified. In this case, the server 150 may respectively convert the plurality of pieces of message data into the plurality of pieces of operation data.

As a detailed example, when receiving the first message data and second message data and respectively converting the first message data and the second message data into the first operation data and the second operation data, the server 150 may sort the first operation data and the second operation data based on the transmission order according to the predetermined criterion.

According to an embodiment, the predetermined criterion may be set based on at least one of a chronological order in which message data is transmitted through a terminal, a chronological order in which message data is received in the server 150, a chronological order determined according to the nature of the message data, or any combination thereof.

For example, when the predetermined criterion is set based on the chronological order in which the message data is received in the server 150 and when the first message data is received in the server 150 before the second message data is received in the server 150, the server 150 may sort the first operation data into which the first message is converted earlier than the second operation data into which the second message data is converted. In other words, when the reception time of the first message data at the server (150) is earlier than the reception time of the second message data, the server (150) may prioritize sorting the first operational data over the second operational data. In this case, although the second message data is transmitted through the second terminal 120 is before the first message data is transmitted through the first terminal 110, the server 150 may sort the first operation data earlier than the second operation data.

For example, when the predetermined criterion is set based on the chronological order in which the message data is transmitted through the terminal and when the first message data is transmitted through the first terminal 110 before the second message data is transmitted through the second terminal 120, the server 150 may sort the first operation data into which the first message data is converted earlier than the second operation data into which the second message data is converted.

For another example, when the predetermined criterion is set based on the chronological order determined according to the nature of the message data, when the first message data has an urgent or important nature, and when the second message data has a general nature, which is not urgent or important, the server 150 may sort the first operation data into which the first message data is converted earlier than the second operation data into which the second message data is converted.

According to an embodiment, the plurality of pieces of operation data may be sorted by means of a buffer. For example, the server 150 may be temporarily store the plurality of pieces of data in the buffer based on the transmission order according to the predetermined criterion. In this case, each of the pieces of operation data may be transmitted to the robot 160 in an order where it is stored in the buffer.

According to an embodiment, the server 150 may analyze message data received through the terminal. For example, the server 150 may analyze at least one of an intention of the message, an emotion contained in the message, importance of the message, or any combination thereof based on the message data. For another example, the server 150 may analyze the message data in a semantic manner.

As a detailed example, the server 150 may perform an analysis for determining an intention to be delivered by means of the message by a user, an intention for everyday communication, an intention to deliver information, an intention to make a notice, an intention to ask a question, or the like.

As another detailed example, the server 150 may perform an analysis for determining the emotion contained in the message of the user as a happy emotion, a sad emotion, an angry emotion, or the like.

As another detailed example, the server 150 may perform an analysis for determining importance of the message based on urgency, risk, priority, or the like of the message.

According to an embodiment, the server 150 may convert the message data into operation data based on the result of analyzing the message data. In this case, the server 150 may sort the plurality of pieces of operation data based on a transmission order according to the result of analyzing each of the pieces of message data. For example, the server 150 may first sort operation data with high importance of the message.

According to an embodiment, the server 150 may store user information included in the message data in a database. In detail, the server 150 may store user information including at least one of a name of a user corresponding to a terminal, an ID of the user, a nickname of the user, an age of the user, a gender of the user, a number for specifying the user, or any combination thereof in the database. As a detailed example, the server 150 may store first user information included in the first message data in the database.

According to an embodiment, the server 150 may analyze a phrase frequently used according to an age, a gender, or a specific user, based on the user information stored in the database.

For example, the server 150 may analyze a phrase frequently used in a message by a user in his or her 20s, 30s, 40s, or 50s. For another example, the server 150 may analyze a phrase frequently used in a message by a male user or a female user. For another example, the server 150 may analyze a phrase frequently used in a message by a specific user.

According to an embodiment, the server 150 may recommend a message phrase to the user based on the user information stored in the database. For example, the server 150 may recommend a phrase frequently used by the user based on the result analyzed according to the age, the gender, or the specific user. As a detailed example, the server 150 may recommend a phrase frequently used by the first user by means of the first terminal 110, based on the first user information stored in the database. In addition, the server 150 may use the user information stored in the database in various methods.

According to an embodiment, the server 150 may transmit the plurality of pieces of operation data to the robot 160 in the sorted order. For example, when the plurality of pieces of operation data is sorted in the buffer based on the transmission order, each of the pieces of operation data may be transmitted to the robot 160 in the sorted order.

According to an embodiment, the robot 160 may perform an operation according to the operation data received from the server 150. For example, when receiving the first operation data from the server 150, the robot 160 may perform an operation included in the first operation data.

For another example, when sequentially receiving the plurality of pieces of operation data, the robot 160 may perform an operation in an order in which each of the pieces of operation data is received.

According to an embodiment, when receiving the plurality of pieces of operation data corresponding to messages of a plurality of users, the robot 160 may separate a plurality of users to perform an operation. For example, the robot 160 may separate the plurality of users using a different specific operation separated for each user, a light of a different color, which is emitted by means of a light emitting element, or the like.

According to an embodiment, whenever the performance of the operation according to the received operation data is ended, the robot 160 may perform a finishing operation indicating the end of the operation according to the operation data.

For example, when sequentially receiving the first operation data, the second operation data, and the third operation data from the server 150, the robot 160 may perform a finishing operation, when the operation according to the first operation data is ended. Then, the robot 160 may perform an operation according to the second operation data. Likewise, when the operation according to the second operation data is ended, the robot 160 may perform a finishing operation and then may perform an operation according to the third operation data.

Thus, users who receive the messages by means of the robot 160 may separate the plurality of messages by means of the finishing operations of the robot 160.

According to an embodiment, the robot 160 may separate the plurality of pieces of operation data for each user based on the user information included in the operation data received from the server 150.

According to an embodiment, when receiving the plurality of pieces of operation data corresponding to the plurality of user, the robot 160 may perform a finishing operation for each user whenever the operation according to each of the pieces of operation data is ended.

For example, when performing first to third operations corresponding to messages of first to third users, the robot 160 may perform a first finishing operation corresponding to the first user when the first operation is ended, may perform a second finishing operation corresponding to the second user when the second operation is ended, and may perform a third finishing operation corresponding to the third user when the third operation is ended.

Thus, users who receive the messages by means of the robot 160 may separate messages of the plurality of users by means of the different finishing operations of the robot 160 for each user.

According to an embodiment, the robot 160 may include a light emitting element. At this time, the light emitting element may be an element, which converts electricity into light and emits the light. For example, the light emitting element may include a light emitting diode (LED), an injection laser diode (ILD), or the like. Furthermore, the light emitting element may emit lights of various colors.

According to an embodiment, the light emitting elements may be located in various portions of the robot 160. For example, the light emitting element may be located in a portion where users who receive a message by means of the sign language of the robot 160 are able to well identify light. As a detailed example, the light emitting element may be located in a wrist portion, a finger, a palm, or the entire hand shape of the robot 160.

According to an embodiment, the robot 160 may separate operations according to the plurality of pieces of operation data based on colors of lights through the light emitting element. For example, when the robot 160 performs the operation according to the first operation data, the light emitting element may emit a light of a first color. When the robot 160 performs the operation according to the second operation data, the light emitting element may emit a light of a second color. At this time, the first color and the second color may be divided into different colors.

According to an embodiment, the robot 160 may separate a user based on the color of the light through the light emitting element. For example, when the robot 160 performs the operation according to the first operation data corresponding to the first user, the light emitting element may emit the light of the first color. When the robot 160 performs the operation according to the second operation data corresponding to the second user, the light emitting element may emit the light of the second color. As a detailed example, when the robot 160 performs an operation according to the message transmitted by the first user, the light emitting element may emit a light corresponding to a blue color. When the robot 160 performs an operation according to a message transmitted by the second user, the light emitting element may emit a light corresponding to a green color.

Thus, the users who receive the message through the robot 160 may separate the message or the user by means of colors of different lights emitted by means of the light emitting element.

According to an embodiment, the robot 160 may represent at least one of an intention of a message, an emotion contained in the message, importance of the message, or any combination thereof by means of the light of the light emitting element.

For example, the robot 160 may represent the emotion, such as a happy emotion, a sad emotion, an angry emotion, or the like, which is contained in the message, using a light of a different color by means of the light emitting element. As a detailed example, the robot 160 may emit a light corresponding to a yellow color, when performing an operation according to the message of the happy emotion, and may emit a light corresponding to a red color, when performing an operation according to the message of the angry emotion.

For example, the robot 160 may represent urgency, risk, importance, or the like of the message using a light of a different color by means of the light emitting element. As a detailed example, the robot 160 may emit a light corresponding to a yellow color by means of the light emitting element, when performing an operation according to a message with high urgency, and may emit a light corresponding to a red color by means of the light emitting element, when performing an operation according to a message with high risk.

According to an embodiment, the user may enter a color of a light to be represented by means of the light emitting element of the robot 160 in a terminal. In this case, the robot 160 may perform an operation according to operation data, together with a light corresponding to the color input by the user.

For example, when the user enters a red color in the first terminal 110 to deliver the angry emotion by means of the message, the first terminal 110 may transmit the first message data including information about the angry emotion according to the red color entered by the user to the server 150. Thus, the robot 160 may emit the light corresponding to the red color by means of the light emitting element and may perform an operation according to the first operation data.

Thus, the users who receive the message through the robot 160 may determine an emotion of the user who transmits the message, importance of the message, or the like, by means of colors of different lights through the light emitting element.

According to an embodiment, the system 100 for providing the sign language service may further include a display. For example, the display may include an output device such as a TV, a monitor, a beam projector, or a laptop.

According to an embodiment, the display may receive message data or operation data from the server 150. For example, the display may include a communication circuit capable of performing wired or wireless communication with the server 150.

According to an embodiment, the user enter information corresponding to at least one of a color, an emoticon, or any combination thereof by means of the terminal. For example, the color entered by the user, the emoticon entered by the user, or the like may represent an emoticon to be delivered through a message, importance of the message, or the like. As a detailed example, when wanting to represent the angry emotion, the user may enter an angry face emoticon.

According to an embodiment, the server 150 may transmit message data or operation data including information corresponding to at least one of the color entered by the user, the emoticon entered by the user, or any combination thereof to the display.

According to an embodiment, the display may display the information corresponding to the at least one of the color entered by the user, the emoticon entered by the user, or the any combination thereof. For example, the display may display the information corresponding to the at least one of the color entered by the user, the emoticon entered by the user, or the any combination thereof in a method of at least one of text, an image, a video, or any combination thereof.

For example, when an emoticon representing an angry emotion of the first user is included in first message data or first operation data, while the robot 160 performs an operation according to the first operation data, the display may display the emoticon entered by the user.

As a detailed example, the users who receive the message through the robot 160 and the display may identify the emoticon of the angry emotion displayed on the display together with the operation performed by the robot 160. Thus, the users who receive the message may identify that the user who transmits the message is in an angry state.

Figure 2:
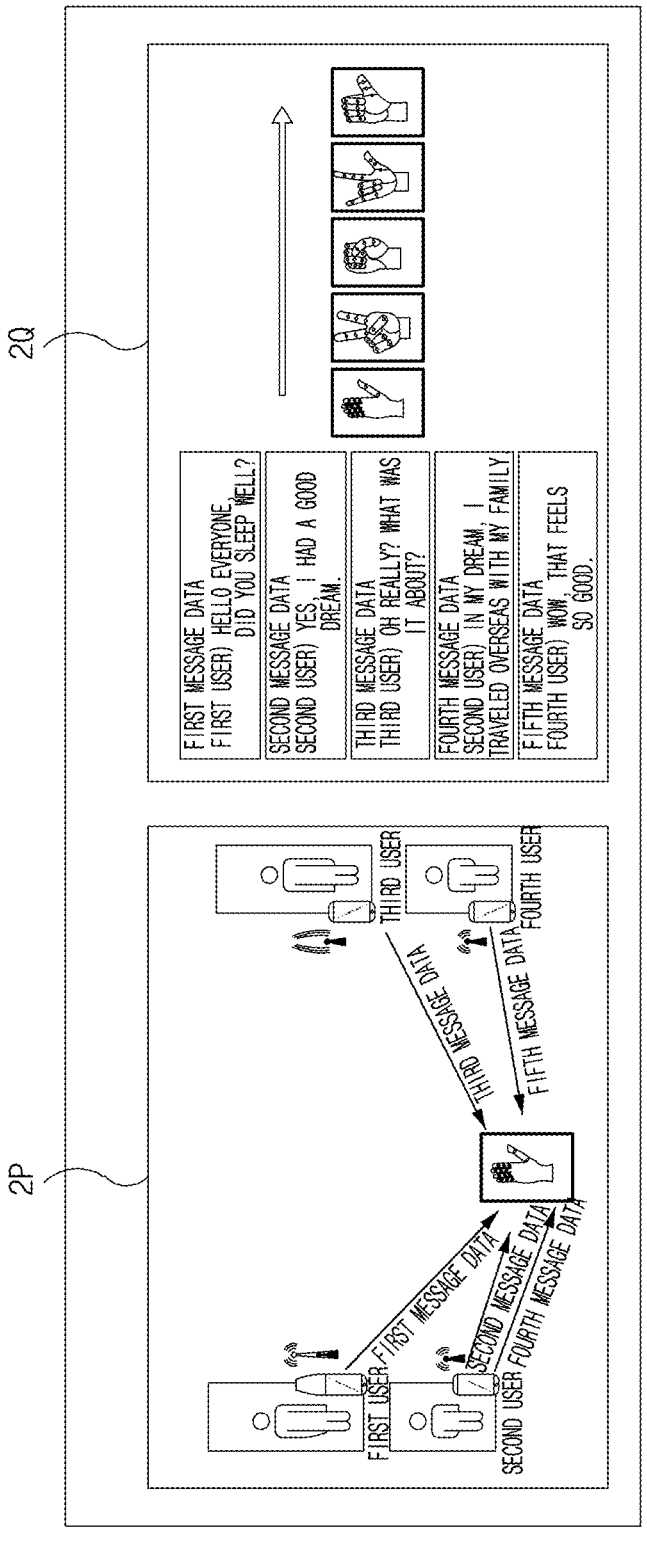
FIG. 2 is a drawing illustrating an example in which an operation of a robot is implemented in an order in which a plurality of messages is transmitted, in a system for providing a sign language service according to an embodiment of the present disclosure.

FIG. 2 is a drawing illustrating an example in which an operation of a robot is implemented in an order in which a plurality of messages is transmitted, in a system for providing a sign language service according to an embodiment of the present disclosure.

According to an embodiment, FIG. 2 includes a structure diagram 2P of a space where users and a robot are located together and an example 2Q in which an operation of the robot is implemented in an order in which a plurality of messages is transmitted.

Referring to the structure diagram 2P of the space where the users and the robot are located together in FIG. 2, first to fourth users may transmit messages through their own first to fourth terminals to communicate with each other. At this time, each user may transmit a plurality of messages in the process of communicating with each other.

According to an embodiment, the first to fourth terminals may transmit message data corresponding to an order of messages transmitted by the first to fourth users to a server through wired or wireless communication. Although not illustrated in FIG. 2, message data transmitted by the terminal may be converted into operation data in the server to be transmitted to a robot.

For example, first message data may include a message of the first user, second message data may include a message of the second user, third message data may include a message of the third user, fourth message data may include the message of the second user, and fifth message data may include a message of the fourth user.

Referring to the example 2Q in which the operation of the robot is implemented in the order in which the plurality of messages is transmitted in FIG. 2, the robot may sequentially perform operations corresponding to message contents included in the first to fifth message data. For example, the robot may perform an operation of translating the message of the first user, which is included in the first message data, into a sign language and may then perform an operation of translating the message of the second user, which is included in the second message data, into a sign language. Thereafter, the robot may perform an operation of translating the message of the third user, which is included in the third message data, into a sign language and may then and sequentially perform operations of translating the message of the second user, which is included in the fourth message data, and the message of the fourth user, which is included in the fifth message, into sign languages.

According to the embodiment according to FIG. 2, the plurality of users may bidirectionally communicate with each other through one robot.

Figure 3:
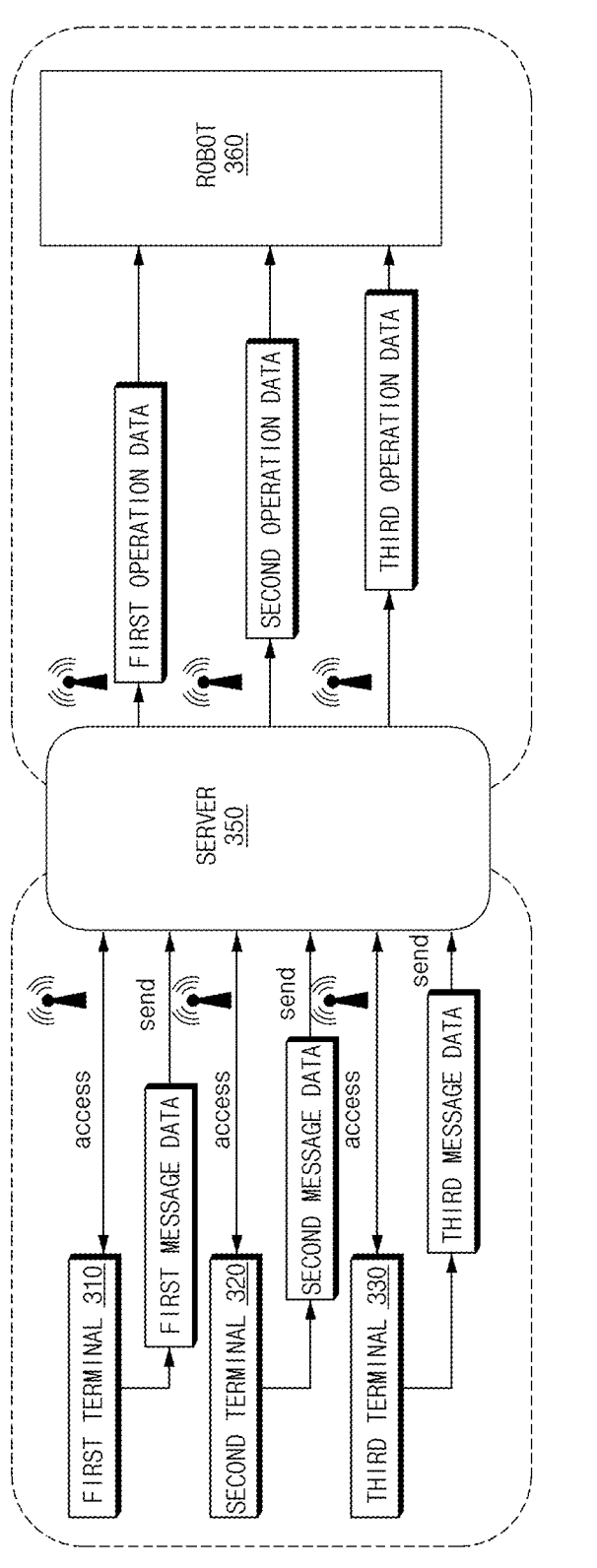
FIG. 3 is a conceptual diagram illustrating an example in which data is transmitted and received among a terminal, a server, and a robot, in a system for providing a sign language service according to an embodiment of the present disclosure.

FIG. 3 is a conceptual diagram illustrating an example in which data is transmitted and received among a terminal, a server, and a robot, in a system for providing a sign language service according to an embodiment of the present disclosure.

Referring to FIG. 3, according to an embodiment, a plurality of terminals may access a server 350 and may transmit message data to the server 350 through wired or wireless communication. The server 350 may convert the received message data into operation data and may transmit the operation data to a robot 360 through wired or wireless communication.

According to an embodiment, first to third terminals 310 to 330 may access the server 350 and may transmit first to third message data to the server 350. The server 350 may sequentially convert the to first third message data transmitted by the first to third terminals 310 to 330 into first to third operation data and may transmit the first to third operation data to the robot 360. The robot 360 may perform respective operations according to the received first to third operation data.

According to the embodiment according to FIG. 3, as the pieces of message data transmitted by the plurality of terminals may be converted into pieces of operation data corresponding to the respective message data and the pieces of operation data may be transmitted to the robot 360, the message entered by the user may be translated into a sign language by means of the robot 360.

Figure 4:
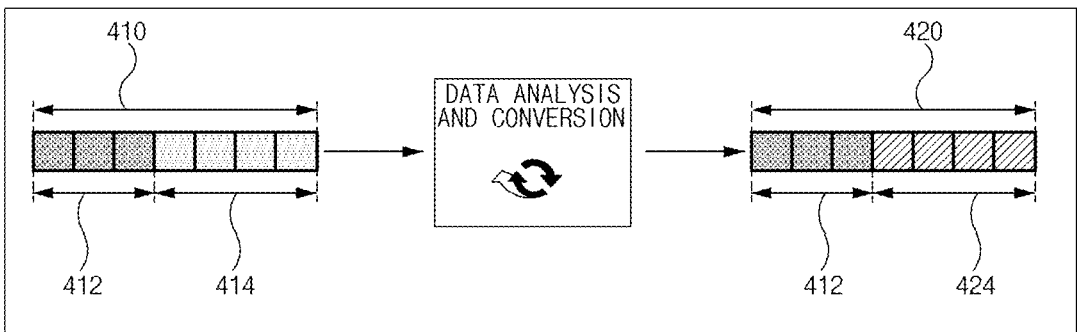
FIG. 4 is a drawing illustrating an example in which message data is converted into operation data, in a system for providing a sign language service according to an embodiment of the present disclosure.

FIG. 4 is a drawing illustrating an example in which message data is converted into operation data, in a system for providing a sign language service according to an embodiment of the present disclosure.

According to an embodiment, a server may convert message data 410 received from a terminal into operation data 420 through a data analysis and conversion process.

According to an embodiment, the message data 410 may include user information 412 and message contents 414.

For example, the user information 412 may include information capable of specifying a user of the terminal. As a detailed example, the user information 412 may include at least one of a name of the user corresponding to the terminal, an ID of the user, a nickname of the user, an age of the user, a gender of the user, a number for specifying the user, or any combination thereof.

For example, the message contents 414 may include contents of a message entered by the user. As a detailed example, the message contents 414 may be included in the form of text, a voice, an image, or the like.

According to an embodiment, the operation data 420 may include user information 412 and message contents 424.

For example, the user information 412 in the operation data 420 may be the same data as the user information 412 included in the message data 410. In other words, although the message data 410 passes through the data analysis and conversion process, the user information 412 may be not changed. However, this is not necessarily limited thereto. The message data 410 may be another type of data capable of being matched with the operation data 420 while including the user information 412.

For example, the operation contents 424 may include contents about an operation of a robot. As a detailed example, the operation contents 424 may include contents about an operation of translating the message contents 414 into a sign language. Furthermore, the operation contents 424 may include an instruction to control the robot to perform the operation translated into the sign language.

According to an embodiment, the data analysis and conversion process performed in the server may include a process of separating the user information 412 and the message contents 414 and converting the message contents 414 into the operation contents 424.

Figure 5:
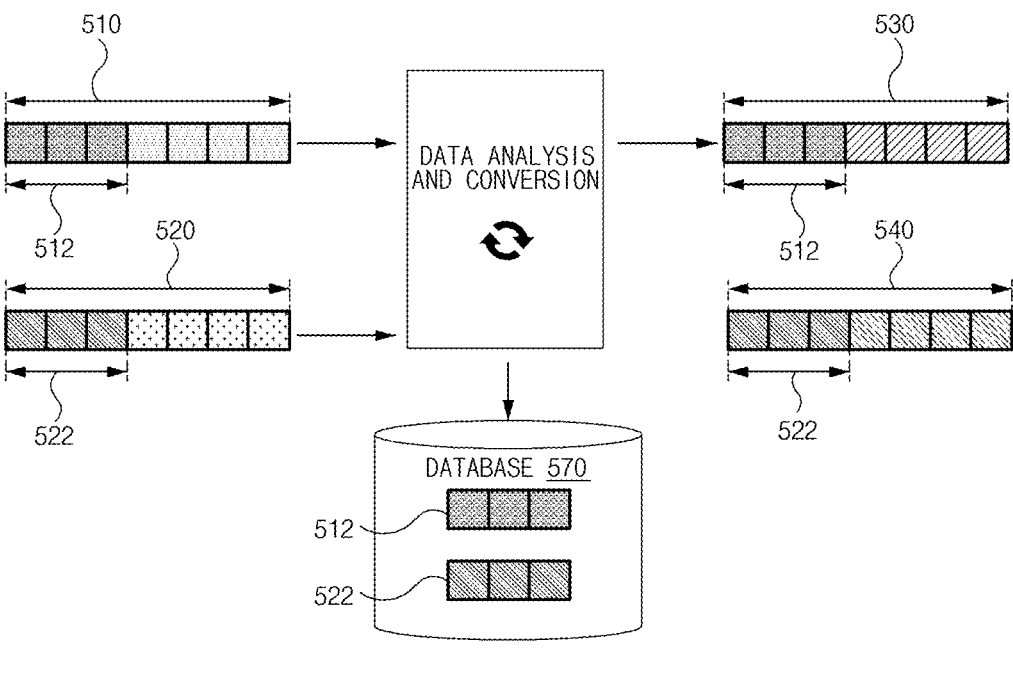
FIG. 5 is a drawing illustrating an example in which pieces of user information of a plurality of pieces of message data are stored in a database, in a system for providing a sign language service according to an embodiment of the present disclosure.

FIG. 5 is a drawing illustrating an example in which pieces of user information of a plurality of pieces of message data are stored in a database, in a system for providing a sign language service according to an embodiment of the present disclosure.

According to an embodiment, message data may be converted into operation data through a data analysis and conversion process of a server, and user information included in the message data may be stored in a database 570.

For example, first message data 510 including first user information 512 may be converted into first operation data 530 including the first user information 512. Furthermore, second message data 520 including second user information 522 may be converted into second operation data 540 including the second user information 522.

For example, in the process in which the first message data 510 and the second message data 520 are converted into the first operation data 530 and the second operation data 540, the first user information 512 and the second user information 522 may be stored in the database 570.

According to an embodiment, the server may recommend a message phrase to a user using the user information stored in the database 570. For example, the server may recommend a phrase frequently used by the user, which is analyzed based on a name of the user, an ID of the user, a nickname of the user, an age of the user, a gender of the user, a number for specifying the user, or the like, to the user. When entering a message by means of the terminal, the user may use a message phrase recommended from the server.

For example, the server may recommend a message phrase frequently used by a first user to the first user based on the first user information 512 stored in the database 570 and may recommend a message phrase frequently used by a second user to the second user based on the second user information 522.

According to the embodiment according to FIG. 5, as the user enters the message using the message phrase recommended from the server, the convenience of entering the input to be delivered may be improved.

Figure 6A:
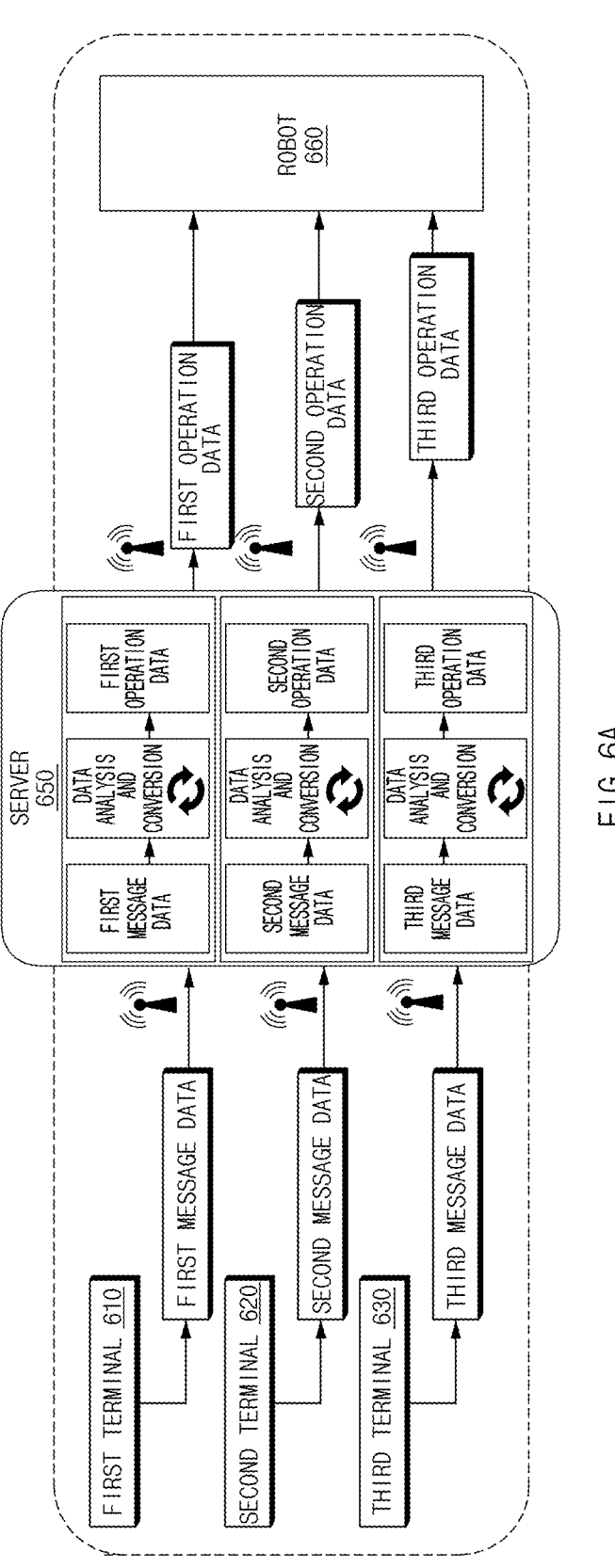
FIG. 6A is a conceptual diagram illustrating an example in which message data is converted into operation data in a server, in a system for providing a sign language service according to another embodiment of the present disclosure.
Figure 6B:
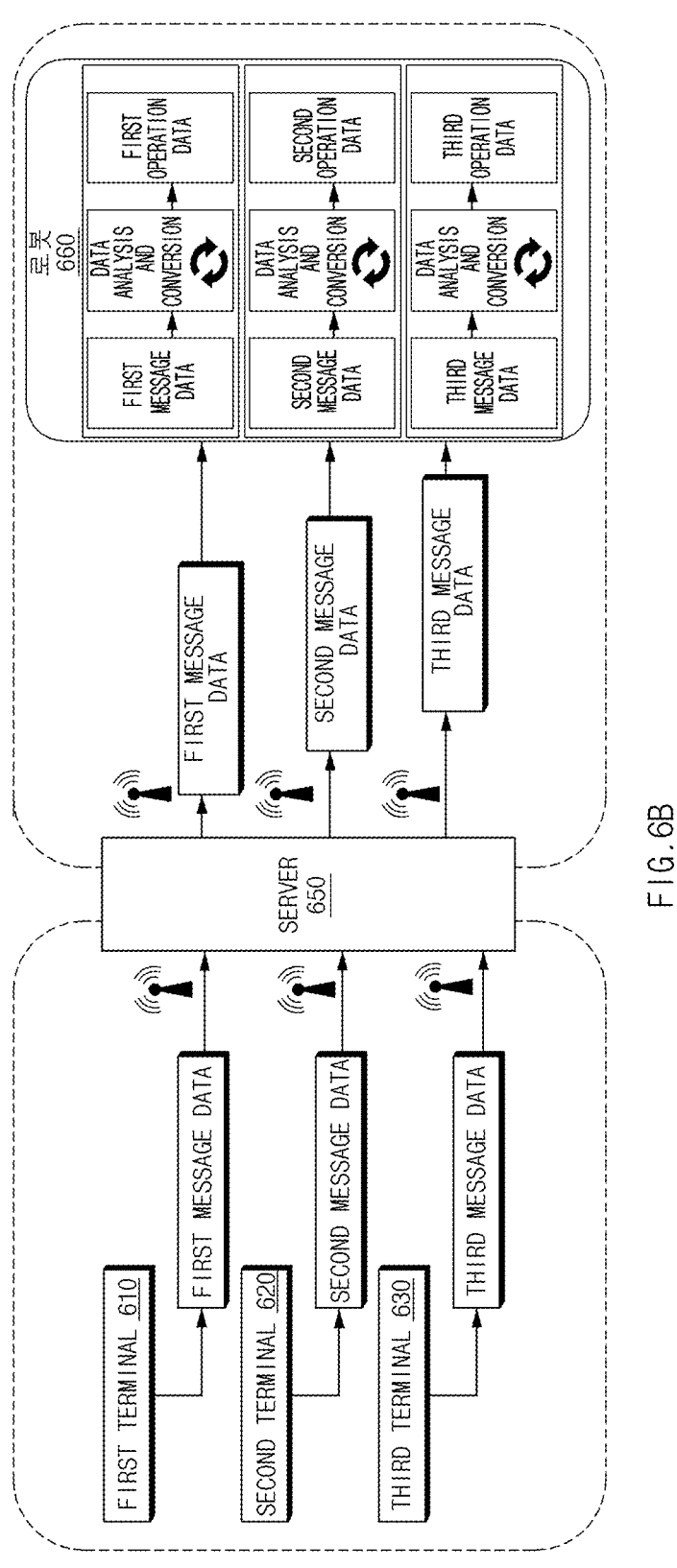
FIG. 6B is a conceptual diagram illustrating an example in which message data is converted into operation data in a robot, in a system for providing a sign language service according to another embodiment of the present disclosure.
Figure 6C:
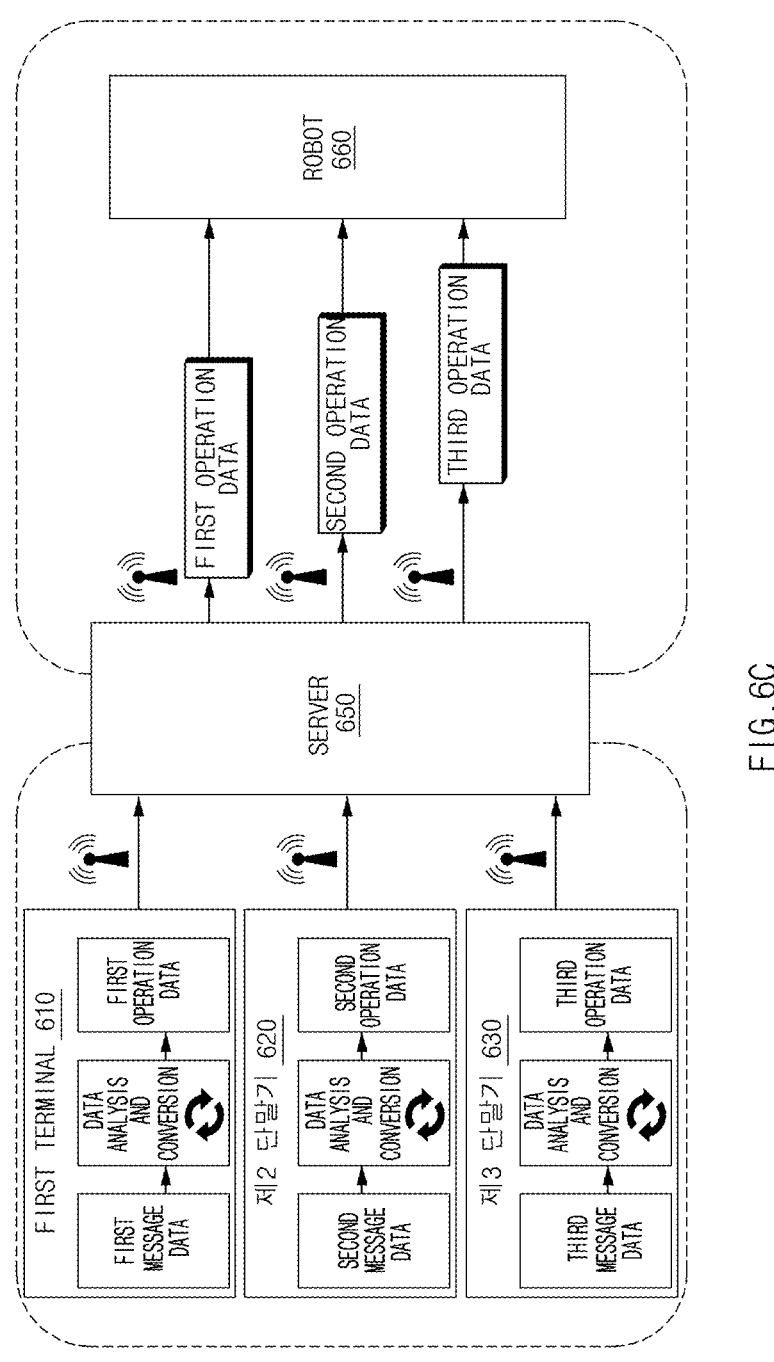
FIG. 6C is a conceptual diagram illustrating an example in which message data is converted into operation data in a terminal, in a system for providing a sign language service according to another embodiment of the present disclosure.

FIGS. 6A, 6B, and 6C are conceptual diagrams illustrating a detailed example in which message data is converted into operation data, in a system for providing a sign language service according to an embodiment of the present disclosure.

According to an embodiment, a server, a robot, or a terminal may include a memory storing a program instruction and a processor configured to execute the program instruction. For example, the processor may convert message data into operation data through a data analysis and conversion process.

FIG. 6A is a conceptual diagram illustrating an example in which message data is converted into operation data in a server, in a system for providing a sign language service according to embodiment of the present disclosure.

According to an embodiment, a position where message data is converted into operation data through a data analysis and conversion process may be a server 650.

For example, the server 650 may convert message data into operation data through the data analysis and conversion process.

As a detailed example, the server 650 may respectively convert first message data received from a first terminal 610, second message data received from a second terminal 620, and third message data received from a third terminal 630 into first operation data, second operation data, and third operation data through the data analysis and conversion process. The server 650 may sort and transmit the converted first operation data, the converted second operation data, or the converted operation data to a robot 660.

For example, the robot 660 may sequentially perform respective operations according to the received first operation data, the received second operation data, and the received third operation data.

According to the embodiment according to FIG. 6A, as the data analysis and conversion is performed by the server, a burden on the terminal of a user or a processor of the robot may be reduced.

FIG. 6B is a conceptual diagram illustrating an example in which message data is converted into operation data in a robot, in a system for providing a sign language service according to embodiment of the present disclosure.

According to an embodiment, a position where message data is converted into operation data through a data analysis and conversion process may be a robot 660.

For example, the robot 660 may convert message data into operation data through the data analysis and conversion process.

As a detailed example, a server 650 may deliver first message data received from a first terminal 610, second message data received from a second terminal 620, and third message data received from a third terminal 630 to the robot 660.

For example, the robot 660 may respectively convert the first message data, the second message data, and the third message data received from the server 650 into first operation data, second operation data, and third operation data through the data analysis and conversion process.

For example, the robot 660 may sequentially perform respective operations according to the received first operation data, the received second operation data, and the received third operation data.

According to the embodiment according to FIG. 6B, the server may have a burden on only the role of delivering the message data received from the terminal to the robot.

FIG. 6C is a conceptual diagram illustrating an example in which message data is converted into operation data in a terminal, in a system for providing a sign language service according to embodiment of the present disclosure.

According to an embodiment, a position where message data is converted into operation data through a data analysis and conversion process may be a terminal.

For example, the terminal may convert message data into operation data through the data analysis and conversion process. The terminal may transmit operation data to a server 650, and the server 650 may transmit the received operation data to a robot 660.

As a detailed example, when a user enters a message using a first terminal 610, the first terminal 610 may generate first message data and may convert the first message data into first operation data through the data analysis and conversion process. Likewise, a second terminal 620 and a third terminal 630 may respectively convert second message data and third message data into second operation data and third operation data through such a process.

For example, the server 650 may receive the first operation data, the second operation data, and the third operation data respectively from the first terminal 610, the second terminal 620, and the third terminal 630 and may transmit the first operation data, the second operation data, and the third operation data to the robot 660.

For example, the robot 660 may sequentially perform respective operations according to the first operation data, the second operation data, and the third operation data.

According to the embodiment according to FIG. 6C, as the message data is converted into the operation data in the terminal to be transmitted to the server, the server may have a burden on only the role of transmitting the received operation data to the robot.

Figure 7:
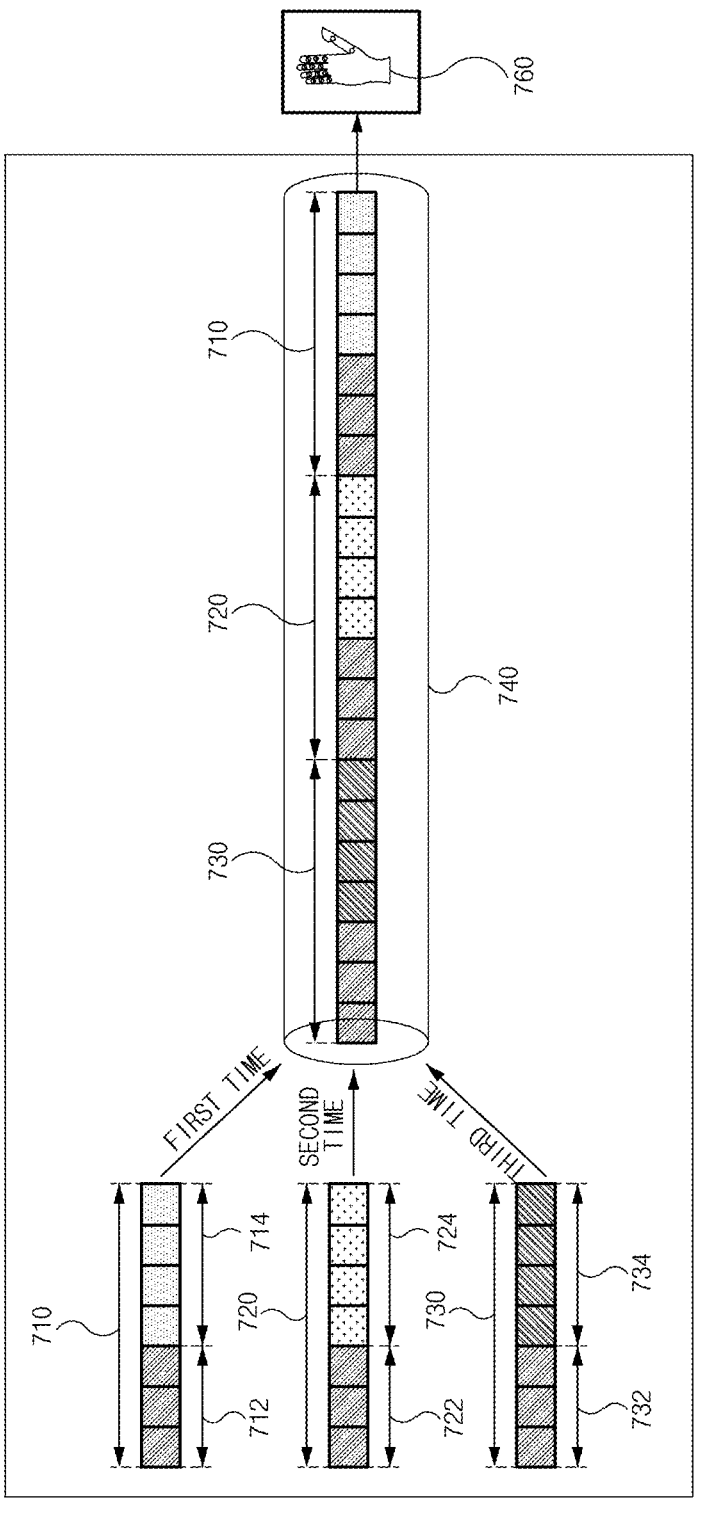
FIG. 7 is a drawing illustrating an example in which a plurality of pieces of operation data are sorted based on a transmission order according to a predetermined criterion, in a system for providing a sign language service according to an embodiment of the present disclosure.

FIG. 7 is a drawing illustrating an example in which a plurality of pieces of operation data is sorted based on a transmission order according to a predetermined criterion, in a system for providing a sign language service according to an embodiment of the present disclosure.

According to an embodiment, a server may sort a plurality of pieces of operation data into which a plurality of pieces of message data are converted, depending on a predetermined criterion.

For example, the predetermined criterion may be set based on at least one of a chronological order in which message data is transmitted through a terminal, a chronological order in which the message data is received in the server, a chronological order determined according to the nature of the message data, or any combination thereof.

As a detailed example, when the predetermined criterion is the chronological order in which the message data is transmitted through the terminal and when pieces of message data are transmitted in an order of a first terminal, a second terminal, and a third terminal, first operation data 710 corresponding to the first terminal is sorted as a first one in a time order ("first time"), second operation data 720 corresponding to the second terminal is sorted as a second one in the time order ("second time"), and third operation data 730 corresponding to the third terminal is sorted as a third one in the time order ("third time"). In this case, the first time, the second time, and the third time may be times according to an order in which the plurality of pieces of operation data are sorted.

According to an embodiment, the plurality of pieces of operation data may be sorted by means of a buffer 740. For example, the server may temporarily store the plurality of pieces of operation data in the buffer 740 based on a transmission order according to a predetermined criterion. In this case, the respective pieces of operation data may be transmitted to a robot 760 in an order in which they are stored in the buffer 740.

According to an embodiment, the first operation data 710 may include first user information 712 and first operation contents 714. The second operation data 720 may include second user information 722 and second operation contents 724. The third operation data 730 may include third user information 732 and third operation contents 734.

According to an embodiment, when the first operation data 710, the second operation data 720, and the third operation data 730 are a plurality of pieces of operation data by the same user, the first user information 712, the second user information 722, and the third user information 732 may include the same user information.

According to another embodiment, when the first operation data 710, the second operation data 720, and the third operation data 730 are a plurality of pieces of operation data by different users, the first user information 712, the second user information 722, and the third user information 732 may include pieces of information of different users.

According to an embodiment, when the transmission order is determined in an order of the first operation data 710, the second operation data 720, and the third operation data 730, as a result of determining the order in which the plurality of pieces of operation data are transmitted based on the predetermined criterion in the server, the plurality of pieces of operation data may be sorted in an order of the first operation data 710, the second operation data 720, and the third operation data 730.

For example, the first operation data 710, the second operation data 720, and the third operation data 730 may be temporarily stored in the buffer 740 in a sorted order and may then be transmitted to the robot 760.

According to an embodiment, the pieces of operation data may be sorted in a state in which they include user information. For example, the first operation data 710, the second operation data 720, and the third operation data 730 may include the first user information 712, the second user information 722, and the third user information 732, respectively.

According to an embodiment, when the pieces of operation data are sorted in the state in which they include the user information and are transmitted to the robot 760, the robot 760 may separately perform operations according to the pieces of operation data based on the user information.

For example, when the first user information 712, the second user information 722, and the third user information 732 includes pieces of information of different users, the robot 760 may separately deliver a message of a different user using a different specific operation separated for each user or a light of a different color, which is emitted by means of a light emitting element.

According to the embodiment according to FIG. 7, as a plurality of messages transmitted by several users are sorted in a certain order and are transmitted to the robot, the several users may communicate with each other through the one robot.

Figure 8:
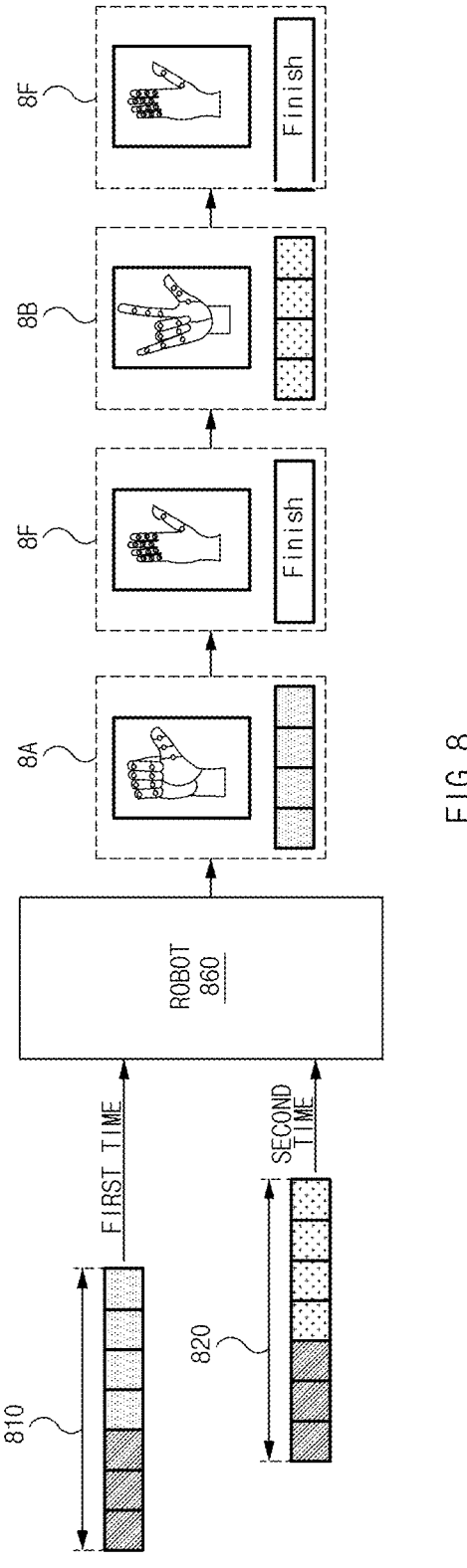
FIG. 8 is a drawing illustrating an example in which a robot performs a finishing operation when a robot ends an operation according to each of pieces of operation data, in a system for providing a sign language service according to an embodiment of the present disclosure.

FIG. 8 is a drawing illustrating an example in which a robot performs a finishing operation when a robot ends an operation according to each of pieces of operation data, in a system for providing a sign language service according to an embodiment of the present disclosure.

According to an embodiment, when the performance of an operation according to received operation data is ended, a robot 860 may perform a finishing operation indicating the end of the operation according to the operation data.

For example, a finishing operation 8F may include an operation, which does not correspond to a specific sign language operation such that users are not confused.

For another example, the finishing operation 8F may include the finishing operation 8F separated for each user to separate messages of different users.

According to an embodiment, when sequentially receiving first operation data 810 and the second operation data 820 from a server, the robot 860 may perform the finishing operation 8F, when an operation 8A according to the first operation data 810 is ended. Them, the robot 860 may perform an operation 8B according to the second operation data 820. Likewise, when the operation 8B according to the second operation data is ended, the robot 860 may perform the finishing operation 8F to provide a notification that the operation is ended.

According to the embodiment according to FIG. 8, users who receive the messages by means of the robot 860 may separate the plurality of messages by means of the finishing operations of the robot 860.

Figure 9:
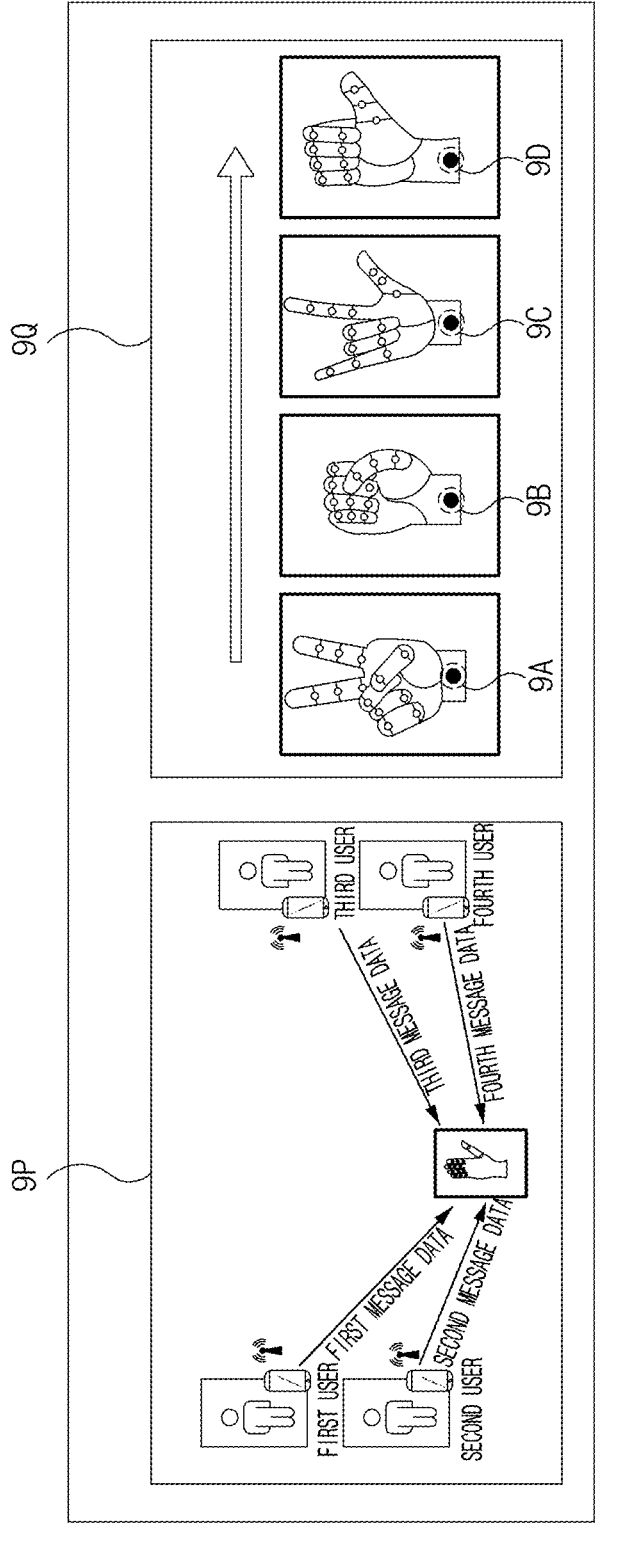
FIG. 9 is a drawing illustrating an example of separating an operation according to a message for each user by means of a light emitting element of a robot, which emits lights of different lights, in a system for providing a sign language service according to an embodiment of the present disclosure.

FIG. 9 drawing illustrating an example of separating an operation according to a message for each user by means of a light emitting element of a robot, which emits lights of different lights, in a system for providing a sign language service according to an embodiment of the present disclosure.

FIG. 9 includes a structure diagram 9P of a space where users and a robot are located together and an example 9Q in which an operation of the robot is implemented in an order in which a plurality of messages are transmitted.

Referring to the structure diagram 9P of the space where the users and the robot are located together in FIG. 9, first to fourth users may transmit messages through their own first to fourth terminals to communicate with each other.

For example, when first to fourth users transmit their own messages in an order of the first user, the second user, the third user, and the fourth user, the message of the first user may be transmitted as first message data to a server, the message of the second user may be transmitted as second message data to the server, the message of the third user may be transmitted as third message data to the server, and the message of the fourth user may be transmitted as fourth message data to the server. The server may respectively convert the pieces of received message data into pieces of operation data and may transmit the pieces of operation data to a robot. The robot may sequentially perform operations according to the pieces of received operation data.

According to an embodiment, the robot may include a light emitting element. The robot may separate different users based on colors of lights through the light emitting element.

For example, a first user may be distinguished by using a light of a first color 9A, a second user may be distinguished by using a light of a second color 9B, a third user may be distinguished by using a light of a third color 9C, and a fourth user may be distinguished by using a light of a fourth color 9D. Thus, while the robot performs an operation corresponding to the message of the first user, the light emitting element may emit the light of the first color 9A.

Furthermore, while the robot performs an operation corresponding to the message of the second user, the light emitting element may emit the light of the second color 9B. Likewise, while the robot performs operations corresponding to the messages of the third user and the fourth user, the light emitting element may emit the lights of the third color 9C and the fourth color 9D.

For another example, the light emitting element may emit lights of different colors and thus may distinguish a plurality of users, a plurality of messages, or the like. Furthermore, the light emitting element may represent the result of analyzing the message using a light of a different color. For example, the light emitting element may represent an intention of the message, an emotion contained in the message, importance of the message, or the like by means of a light of a different color.

According to the embodiment according to FIG. 9, the robot may emit lights of different colors and may separate the plurality of users or the plurality of messages and thus may facilitate bidirectional communication through one robot.

FIG. 10 is a drawing illustrating an example of a color table indicating an emotion and a screen in which a user is able to enter a color together with a message, in a system for providing a sign language service according to an embodiment of the present disclosure.

According to an embodiment, FIG. 10 includes a color table 10P indicting an emotion and a screen 100 in which a user is able to enter a color together with a message.

Referring to the color table 10P indicating the emotion in FIG. 10, according an embodiment, the emotion of the user may be roughly divided into colors in six categories.

For example, excitement, optimistic, confidence, reassurance, honesty, creativity, and the like may be represented in different colors. However, this is only an embodiment. In addition, several emotions of the user may be represented in different colors.

For example, emotions capable of belonging to similar categories may be represented in specific series colors.

As a detailed example, emotions, such as excitement, passion, energy, desire, and action, may be represented in red series colors. For example, the red series colors may include red, crimson, vermilion, magenta, pink, or the like.

As a detailed example, emotions, such as hope, growth, balance, and refreshing, may be represented in green series colors. For example, the green series colors may include green, light green, turquoise, lime, mint, or the like.

Referring to the screen 100 in which the user is able to enter the color together with the message in FIG. 10, the user may enter a color capable of indicating his or her own emotion (10X). For example, the user may enter a color when entering a message and may additionally enter the color after entering the message. As a detailed example, when wanting to transmit a hopeful message, the user may enter a color corresponding to the green.

According to an embodiment, the user may enter a color corresponding to importance of the message as well as his or her emotion. For example, for a message including important contents, the user may enter a color corresponding to the red.

According to the embodiment according to FIG. 10, the user may enter the color corresponding to his or her own emotion together with the message and thus may deliver the emotion contained in the message together through the robot.

Figure 11:
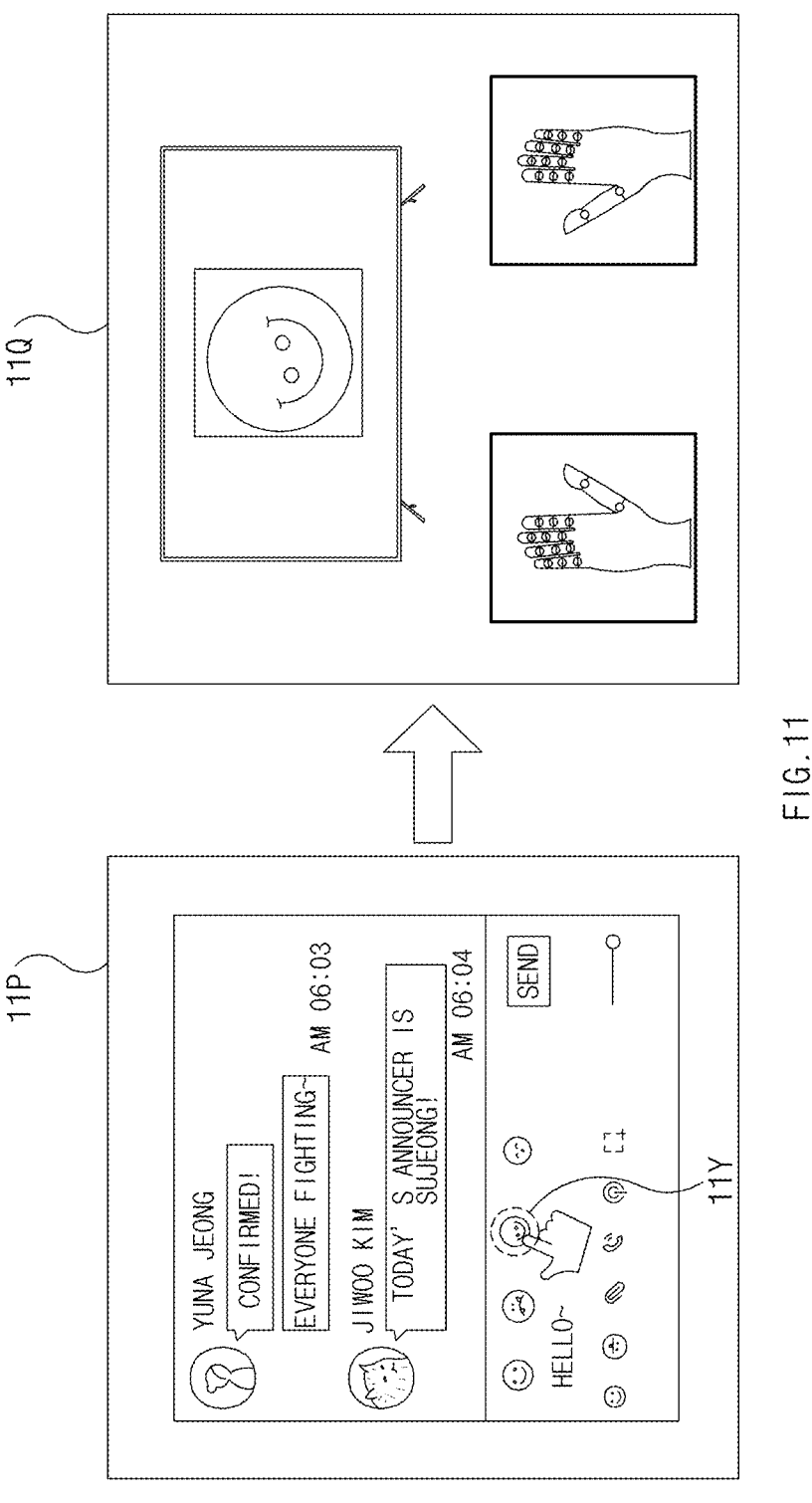
FIG. 11 is a drawing illustrating a screen in which a user is able to enter an emoticon together with a message and illustrating an example in which the emoticon entered by the user is displayed on a display, in a system for providing a sign language service according to an embodiment of the present disclosure.

FIG. 11 is a drawing illustrating a screen in which a user is able to enter an emoticon together with a message and an example in which the emoticon entered by the user is displayed on a display, in a system for providing a sign language service according to an embodiment of the present disclosure.

Referring to a screen 11P in which the user is able to enter an emoticon together with a message in FIG. 11, the user may enter an emoticon 11Y indicating his or her own emotion while entering the message. For another example, the user may enter a moving emoticon corresponding to his or her own emotion. For another example, the user may enter image information corresponding to his or her own emotion.

As a detailed example, when wanting to transmit a message of fun contents, the user may enter the smiling emoticon 11Y.

Referring to the example 110 in which the emoticon entered by the user is displayed on the display in FIG. 11, a system for providing a sign language service may further include a display. The display may include an output device such as a TV, a monitor, a beam projector, or a laptop. Furthermore, the display may be included in a robot.

According to an embodiment, message data or operation data including information corresponding to at least one of a color entered by the user or the emoticon entered by the user, or any combination thereof may be transmitted to the display through a server.

For example, the server and the display may transmit data through wired or wireless communication. However, this is not necessarily limited thereto. Data may be directly transmitted from a terminal of the user to the display.

According to an embodiment, the emoticon entered by the user may be displayed on the display. For example, when the user enters the smiling emoticon while transmitting the message of the fun contents, the smiling emoticon entered by the user may be displayed on the display while the robot translates the message into a sign language.

For another example, when the user enters a photo, an image, or the like rather than the emoticon, the photo, the image, or the like entered by the user may be displayed on the display.

According to the embodiment according to FIG. 11, users may receive message contents through the sign language operation of the robot and may simultaneously identify an emotion included in the message by means of the display.

Figure 12:
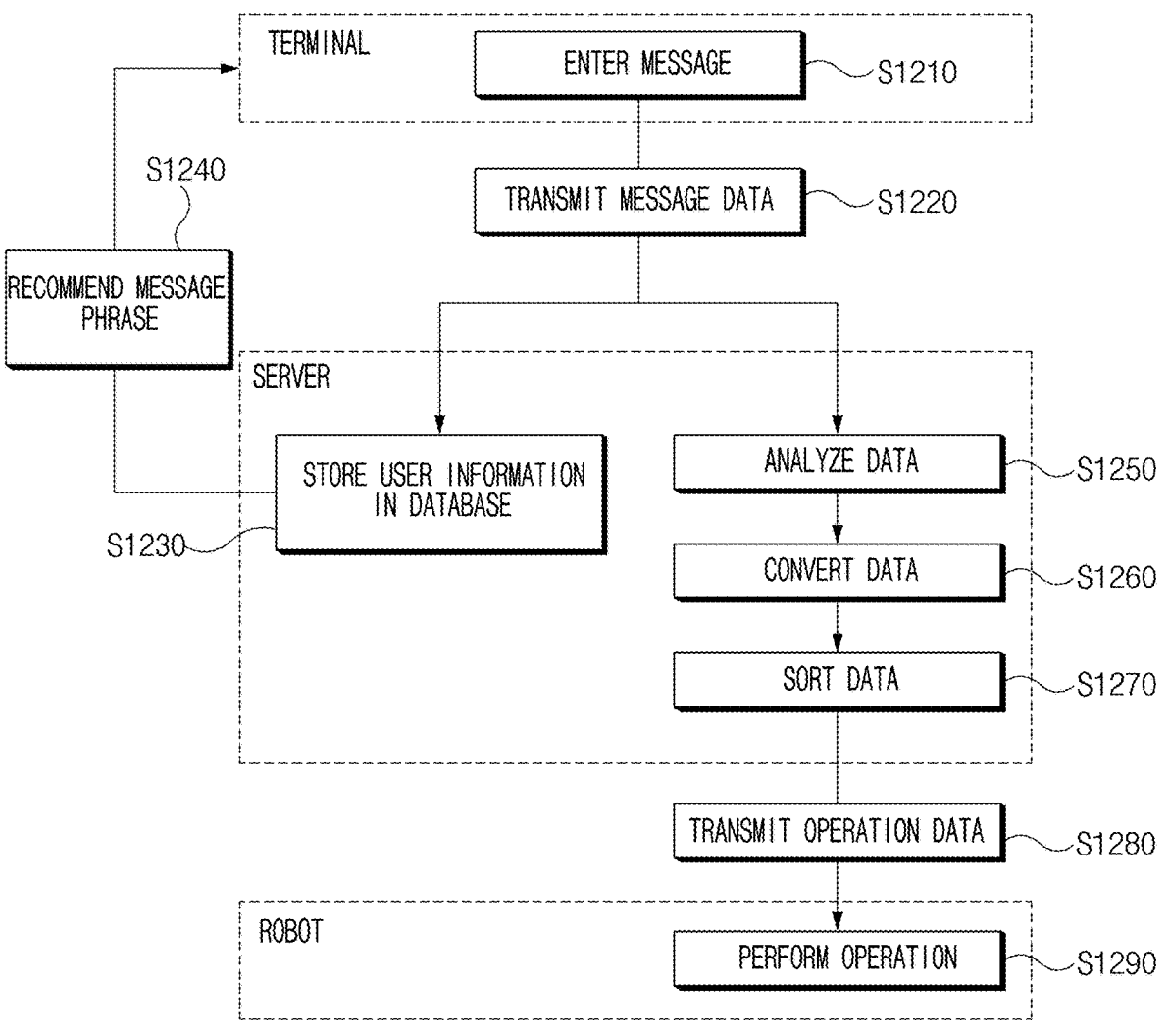
FIG. 12 is a conceptual diagram illustrating a general process in which a data message generated by a terminal is converted into operation data in a server to be implemented as an operation performed by a robot, in a system for providing a sign language service according to another embodiment of the present disclosure.

FIG. 12 is a conceptual diagram illustrating a general process in which a data message generated by a terminal is converted into operation data in a server to be implemented as an operation performed by a robot, in a system for providing a sign language service according to another embodiment of the present disclosure.

According to an embodiment, in S1210, a user may enter a message to be delivered using a terminal. Herein, the user and the terminal are described in a singular form according to an embodiment and may be described as a plurality of users and a plurality of users.

According to an embodiment, the terminal may generate message data based on the message entered by the user and user information. In S1220, the terminal may transmit the message data to a server.

According to an embodiment, in S1230, the server may store the user information included in the message data in a database. In detail, the server may store the user information including at least one of a name of the user corresponding to the terminal, an ID of the user, a nickname of the user, an age of the user, a gender of the user, a number for specifying the user, or any combination thereof in the database. For another example, the server may store the message data itself in the database.

For example, in S1240, the server may recommend a message phrase to the user using the user information stored in the database. In detail, the server may recommend a phrase frequently used according to an age, a gender, or a specific user, based on the user information stored in the database. The message phrase recommended from the server may be transmitted to a user terminal. The user may enter a message using the recommended message phrase.

According to an embodiment, the server may receive the message data from the terminal and may perform data analysis and conversion.

For example, in S1250, the server may analyze at least one of an intention of the message, an emotion contained in the message, importance of the message, or any combination thereof based on the message data.

For example, in S1260, the server may convert the message data into operation data based on the result of analyzing the message data. Herein, the operation data may include the user information and operation contents about an operation of translating the message contents into a sign language. Furthermore, the operation contents included in the operation data may include an instruction to control the robot to perform the operation translated into the sign language.

For example, in S1270, the server may sort the operation data based on a transmission order according to a predetermined criterion. For example, the server may sort the operation data based on a chronological order in which the message data is a transmitted through the terminal, chronological order in which the message data is received in the server, a chronological order determined according to the nature of the message data, or the like.

For example, in S1280, the server may transmit the operation data to the robot based on the sorted order.

According to an embodiment, in S1290, the robot may perform an operation according to the operation data. For example, the operation performed by the robot may include an operation in which the message is translated into the sign language.

For example, the robot may separate a plurality of users using a different specific operation separated for each user, a light of a different color, which is emitted by means of a light emitting element, or the like. Furthermore, the robot may separate a plurality of messages in such a method.

Hereinafter, a description is given in detail of a method for providing a sign language service according to another embodiment of the present disclosure with reference to FIG. 13.

FIG. 13 is a flowchart for describing a process in which a message written by a user is implemented as an operation performed by a robot, in a method for providing a sign language service according to embodiment of the present disclosure.

According to an embodiment, in S1310, a first user may write a message to be delivered by means of a first terminal.

According to an embodiment, in S1320, the first terminal may generate and transmit first message data corresponding to the message written by the first user to a server. For example, the first message data may include first user information about the first user and message contents entered by the first user. For example, the first terminal may transmit the first message data to the server through wired or wireless communication.

According to an embodiment, in S1330, the sever may convert the first message data received from the first terminal into first operation data. For example, the first operation data may include the first user information and operation contents about an operation of translating message contents into a sign language.

According to an embodiment, when there are two or more pieces of first operation data, in S1340, the server may sort the two or more pieces of first operation data based on a transmission order according to a predetermined criterion.

For example, the predetermined criterion may be set based on at least one of a chronological order in which the transmitted through the terminal, a message data is chronological order in which the message data is received in the server, a chronological order determined according to the nature of the message data, or any combination thereof.

For example, the two or more pieces of first operation data may be sorted by means of a buffer. For example, the server may temporarily store the plurality of pieces of first operation data in the buffer based on the transmission order according to the predetermined criterion.

According to an embodiment, in S1350, the server may transmit the pieces of sorted first operation data to the robot.

For example, each of the pieces of first operation data may be transmitted to the robot in an order in which it is stored in the buffer.

According to an embodiment, in S1360, the robot may perform operations according to the pieces of received first operation data.

For example, when receiving the plurality of pieces of first operation data, the robot may separately perform the operations according to the plurality of pieces of first operation data. According to an embodiment, whenever the performance of the operation according to the first operation data is ended, the robot may perform a finishing operation indicating the end of the operation according to the first operation data. For another example, the robot may distinguish the plurality of pieces of first operation data using lights of different colors, which are emitted by means of a light emitting element, or the like.

According to the embodiment according to FIG. 13, as one robot sequentially performs operations in which the plurality of messages is translated into sign languages, it may efficiently deliver the messages to several users.

Figure 14:
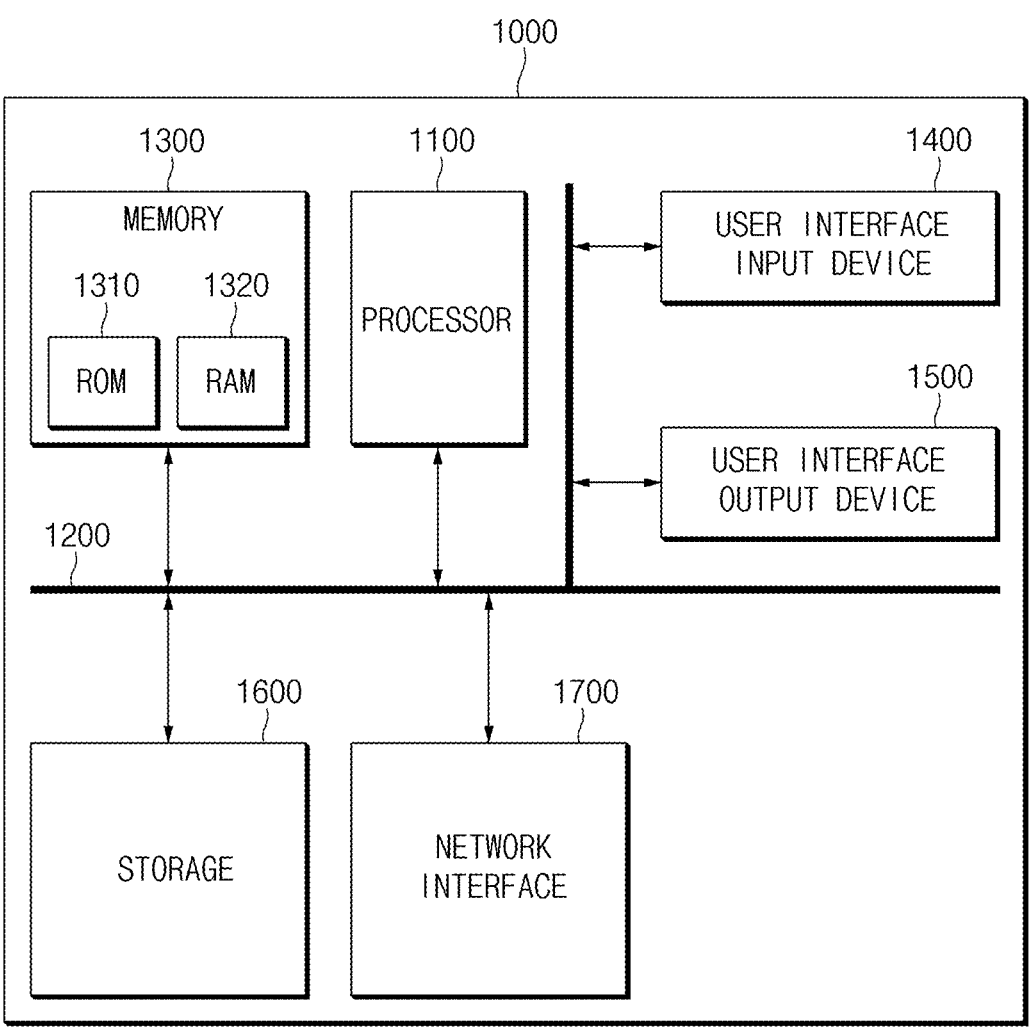
FIG. 14 illustrates a computing system associated with a system for providing a sign language service or a method for providing a sign language service according to an embodiment of the present disclosure.

FIG. 14 illustrates a computing system associated with a system for providing a sign language service or a method for providing a sign language service according to an embodiment of the present disclosure.

Referring to FIG. 14, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may allow several users to perform bidirectional communication through one robot, as the one robot translates a plurality of messages transmitted by several users into sign languages based on a certain order.

Furthermore, the present technology may deliver an emotion, an intention, or the like to be delivered through a message by the user together with the message by means of a light emitting element of a robot, which emits lights of different colors, thus improving the accuracy of delivering the message.

Furthermore, the present technology may reduce costs as several users communicate with each other through one robot.

Furthermore, the present technology may deliver a message with high importance or urgency to several persons at once, thus improving convenience.

In addition, various effects ascertained directly or indirectly through the present disclosure may be provided.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure but provided only for the illustrative purpose. The scope of the present disclosure should be construed on the basis of the accompanying claims, and all the technical ideas within the scope equivalent to the claims should be included in the scope of the present disclosure.

What is claimed is:

1. A system for providing a sign language service, the system comprising:
   a first terminal configured to generate at least one piece of first message data corresponding to a message to be delivered by a first user;
   a server configured to convert the first message data received from the first terminal into first operation data corresponding to an operation of a robot; and
   the robot configured to perform an operation according to the first operation data received from the server,
   wherein the server is further configured to sort two or more pieces of first operation data based on a transmission order according to a predetermined criterion, when identifying the two or more pieces of first operation data,
   wherein the server is further configured to transmit the pieces of sorted first operation data to the robot,
   wherein the robot is further configured to perform the operation, based on the pieces of sorted first operation data, and
   wherein the server is further configured to:
      analyze at least one of an intention of the message, an emotion contained in the message, importance of the message, or any combination thereof based on the first message data;
      convert the first message data into the first operation data, based on an analyzed result; and
      first sort the first operation data with high importance of the message.

2. The system of claim 1, further comprising:
   a second terminal configured to generate at least one piece of second message data corresponding to a message to be delivered by a second user,
   wherein the server is further configured to convert the second message data received from the second terminal into second operation data corresponding to the operation of the robot,
   wherein the server is further configured to sort the first operation data and the second operation data based on the transmission order according to the predetermined criterion, when two or more pieces of the first operation data and the second operation data are identified, wherein the server is further configured to transmit the sorted first operation data and second operation data to the robot, and wherein the robot is further configured to perform the operation, based on the sorted first operation data and second operation data.

3. The system of claim 1, wherein the predetermined criterion is set based on at least one of a chronological order in which the first message data is transmitted through the first terminal, a chronological order in which the first message data is received in the server, a chronological order determined according to nature of the first message data, or any combination thereof.

4. The system of claim 1, wherein the first message data includes first user information including at least one of a name of the first user corresponding to the first terminal, an ID of the first user, a nickname of the first user, an age of the first user, a gender of the first user, a number for specifying the first user, or any combination thereof, and wherein the server is further configured to store the first user information in a database.

5. The system of claim 4, wherein the server is further configured to recommend a message phrase to the first user, based on the first user information stored in the database.

6. The system of claim 1, wherein the robot is further configured to perform a finishing operation indicating end of the operation according to the first operation data, when performance of the operation according to the first operation data received from the server is ended.

7. The system of claim 2, wherein the first message data includes first user information including at least one of a name of the first user corresponding to the first terminal, an ID of the first user, a nickname of the first user, an age of the first user, a gender of the first user, a number for specifying the first user, or any combination thereof, wherein the second message data includes second user information including at least one of a name of the second user corresponding to the second terminal, an ID of the second user, a nickname of the second user, an age of the second user, a gender of the second user, a number for specifying the second user, or any combination thereof, and wherein the robot is further configured to separate the operation according to the first operation data and an operation according to the second operation data to perform the operation, based on the first user information and the second user information.

8. The system of claim 7, wherein the robot includes a light emitting element, wherein the robot is further configured to perform the operation according to the first operation data together with a light corresponding to a first color through the light emitting element, and wherein the robot is further configured to perform the operation according to the second operation data together with a light corresponding to a second color through the light emitting element.

9. The system of claim 1, wherein the robot includes a light emitting element, wherein the robot is further configured to perform the operation according to the first operation data together with at least one light represented by means of the light emitting element, and wherein the at least one light indicates at least one of an intention of the message, an emotion contained in the message, importance of the message, or any combination thereof.

10. The system of claim 1, wherein the first terminal is further configured to generate the first message data including a color entered by the first user, wherein the robot includes a light emitting element, wherein the robot is further configured to perform the operation according to the first operation data, together with a light corresponding to the color entered by the first user, and, wherein the color is represented by means of the light emitting element.

11. The system of claim 1, further comprising:

a display, wherein the first terminal generates the first message data including at least one of a color entered by the first user, an emoticon entered by the first user, or any combination thereof, wherein the display is configured to receive the first message data or the first operation data from the server and display information corresponding to the at least one of the color entered by the first user, the emoticon entered by the first user, or the any combination thereof, and wherein the information is included in the first message data or the first operation data.

12. A method for providing a sign language service, the method comprising:

generating, by a first terminal, at least one piece of first message data corresponding to a message to be delivered by a first user;

converting, by a server, the first message data received from the first terminal into first operation data corresponding to an operation of a robot;

sorting, by the server, two or more pieces of first operation data based on a transmission order according to a predetermined criterion, when identifying the two or more pieces of first operation data;

transmitting, by the server, the pieces of sorted first operation data to the robot; and performing, by the robot, an operation according to the first operation data received from the server, wherein performing the operation according to the first operation data received from the server by the robot includes:

performing, by the robot, the operation, based on the pieces of sorted first operation data, wherein converting the first message data received from the first terminal into the first operation data corresponding to the operation of the robot by the server includes:

analyzing, by the server, at least one of an intention of the message, an emotion contained in the message, importance contained in the message, or any combination thereof based on the first message data; and converting, by the server, the first message data into the first operation data, based on an analyzed result, and wherein sorting, by the server, two or more pieces of first operation data based on a transmission order according to a predetermined criterion includes first sorting the first operation data with high importance of the message.

13. The method of claim 12, further comprising:

generating, by a second terminal, at least one piece of second message data corresponding to a message to be delivered by a second user, wherein converting the first message data received from the first terminal into the first operation data corresponding to the operation of the robot by the server includes:

converting, by the server, the second message data received from the second terminal into second operation data corresponding to the operation of the robot, wherein sorting the two or more pieces of first operation data based on the transmission order according to the predetermined criterion, when identifying the two or more pieces of first operation data, by the server includes:

sorting, by the server, the first operation data and the second operation data based on the transmission order according to the predetermined criterion, when two or more pieces of the first operation data and the second operation data are identified, and wherein transmitting the pieces of sorted first operation data to the robot by the server includes:

transmitting, by the server, the sorted first operation data and second operation data to the robot, and wherein performing the operation according to the first operation data received from the server by the robot includes:

performing, by the robot, the operation, based on the sorted first operation data and second operation data.

14. The method of claim 12, wherein the predetermined criterion is set based on at least one of a chronological order in which the first message data is transmitted through the first terminal, a chronological order in which the first message data is received in the server, a chronological order determined according to nature of the first message data, or any combination thereof.

15. The method of claim 12, wherein the first message data includes first user information including at least one of a name of the first user corresponding to the first terminal, an ID of the first user, a nickname of the first user, an age of the first user, a gender of the first user, a number for specifying the first user, or any combination thereof, where the method further comprises:

storing, by the server, the first user information in a database; and recommending, by the server, a message phrase to the first user, based on the first user information stored in the database.

16. The method of claim 13, wherein the first message data includes first user information including at least one of a name of the first user corresponding to the first terminal, an ID of the first user, a nickname of the first user, an age of the first user, a gender of the first user, a number for specifying the first user, or any combination thereof, wherein the second message data includes second user information including at least one of a name of the second user corresponding to the second terminal, an ID of the second user, a nickname of the second user, an age of the second user, a gender of the second user, a number for specifying the second user, or any combination thereof, and wherein performing the operation, depending on the sorted first operation data and second operation signal, by the robot includes:

separating the operation according to the first operation data and an operation according to the second operation data to perform the operation, based on the first user information and the second user information.

17. The method of claim 16, wherein the robot includes a light emitting element, and wherein separating the operation according to the first operation data and the operation according to the second operation data to perform the operation, based on the first user information and the second user information, by the robot includes:

performing, by the robot, the operation according to the first operation data together with a light corresponding to a first color through the light emitting element; and performing, by the robot, the operation according to the second operation data together with a light corresponding to a second color through the light emitting element.

18. The method of claim 12, wherein the robot includes a light emitting element, wherein performing the operation, depending on pieces of sorted first operation data, by the robot includes:

performing the operation according to the first operation data, together with at least one light represented by means of the light emitting element, and wherein the at least one light indicates at least one of an intention of the message, an emotion contained in the message, importance of the message, or any combination thereof.

* * * * *